US008792652B2

(12) United States Patent
Itou

(10) Patent No.: US 8,792,652 B2
(45) Date of Patent: Jul. 29, 2014

(54) NOISE SUPPRESSING DEVICE, NOISE SUPPRESSING METHOD, AND RECORDING MEDIUM

(75) Inventor: Taisuke Itou, Osaka (JP)

(73) Assignee: Fujitsu Limited, Kawasaki (JP)

( * ) Notice: Subject to any disclaimer, the term of this patent is extended or adjusted under 35 U.S.C. 154(b) by 559 days.

(21) Appl. No.: 12/710,425

(22) Filed: Feb. 23, 2010

(65) Prior Publication Data

US 2010/0215190 A1 Aug. 26, 2010

(30) Foreign Application Priority Data

Feb. 25, 2009 (JP) ................................ 2009-042620

(51) Int. Cl.
*H04B 15/00* (2006.01)
*G10L 21/0208* (2013.01)

(52) U.S. Cl.
CPC .................................. *G10L 21/0208* (2013.01)
USPC ........................................................ 381/94.2

(58) Field of Classification Search
CPC ....... H04N 5/782; H04N 5/92; H04N 9/8205; H04N 9/83; H04N 9/896
USPC .................. 381/86, 92, 104, 106, 94.1–94.4, 381/71.1–71.8, 71.11–71.14, 67; 700/94
See application file for complete search history.

(56) References Cited

U.S. PATENT DOCUMENTS

| | | | | |
|---|---|---|---|---|
| 5,416,844 A * | 5/1995 | Nakaji et al. | ................. | 381/71.4 |
| 5,493,616 A * | 2/1996 | Iidaka et al. | ................. | 381/71.4 |
| 2006/0056642 A1* | 3/2006 | Inoue et al. | ................. | 381/71.11 |
| 2009/0022328 A1* | 1/2009 | Neugebauer et al. | ........... | 381/27 |

FOREIGN PATENT DOCUMENTS

| | | | | |
|---|---|---|---|---|
| JP | 8-123444 | | 5/1996 | |
| JP | 10-207473 | * | 7/1998 | ............. H03H 21/00 |
| JP | 10-207473 | | 8/1998 | |

* cited by examiner

*Primary Examiner* — Lun-See Lao
(74) *Attorney, Agent, or Firm* — Staas & Halsey LLP

(57) ABSTRACT

A noise suppressing device includes a plurality of sound input units inputting sounds from a given sound source and converting the sounds to sound signals on a time axis, a transfer characteristic obtaining unit performing frequency transform of the sound signals after dividing the sound signals into frames and calculating respective transfer characteristics of the sounds for each given frequency band, a storage unit storing the calculated transfer characteristics of the sounds, a frequency obtaining unit obtaining a frequency for updating the transfer characteristics stored in the storage unit for the frequency band, an updating unit updating the transfer characteristics every given number of frames corresponding to the obtained frequency based on the transfer characteristics for each frequency band, a generating unit generating suppression information for suppressing the noise component based on the updated transfer characteristics, and a suppression unit suppressing the noise component based on the suppression information.

17 Claims, 12 Drawing Sheets

FIG. 3

3a

| $0 \le \omega < 64$ | | $64 \le \omega < 128$ | | $128 \le \omega < 192$ | | $192 \le \omega < 256$ | |
|---|---|---|---|---|---|---|---|
| TRANSFER FUNCTION CHANGING RATE | UPDATE FREQUENCY (NUMBER OF FRAMES) | TRANSFER FUNCTION CHANGING RATE | UPDATE FREQUENCY (NUMBER OF FRAMES) | TRANSFER FUNCTION CHANGING RATE | UPDATE FREQUENCY (NUMBER OF FRAMES) | TRANSFER FUNCTION CHANGING RATE | UPDATE FREQUENCY (NUMBER OF FRAMES) |
| [5.0, ∞) | 1 | [5.0, ∞) | 1 | [5.0, ∞) | 1 | [5.0, ∞) | 1 |
| [1.5,5.0) | 2 | [1.5,5.0) | 2 | [2.0,5.0) | 2 | [2.0,5.0) | 2 |
| [1.0,1.5) | 3 | [0.9,1.5) | 3 | [1.6,2.0) | 3 | [1.5,2.0) | 3 |
| [0.8,1.0) | 4 | [0.6,0.9) | 4 | [1.2,1.6) | 4 | [1.0,1.5) | 4 |
| [0.6,0.8) | 5 | [0.4,0.6) | 5 | [1.0,1.2) | 5 | [0.5,1.0) | 5 |
| [0.4,0.6) | 6 | [0.3,0.4) | 6 | [0.5,1.0) | 6 | [0.2,0.5) | 6 |
| [0.3,0.4) | 7 | [0.2,0.3) | 7 | [0.2,0.5) | 7 | [0,0.2) | 7 |
| [0.2,0.3) | 8 | [0.1,0.2) | 8 | [0,0.2) | 8 | | |
| [0.1,0.2) | 9 | [0,0.1) | 9 | | | | |
| [0,0.1) | 10 | | | | | | |

"[" INDICATES "EQUAL TO OR MORE THAN"

")" INDICATES "LESS THAN"

FIG. 11A $$\mathrm{ave}\{X'(\omega)\} = \frac{1}{N}\sum_k X'_k(\omega) \qquad k = 0 \text{ TO } N-1$$

$$\mathrm{ave}\{Y(\omega)\} = \frac{1}{N}\sum_k Y_k(\omega) \qquad k = 0 \text{ TO } N-1$$

FIG. 11B $$\mathrm{ave}\{X'(\omega,n)\} = \alpha \times \mathrm{ave}\{X'(\omega,n-1)\} + (1-\alpha) \times X'(\omega,n)$$

$$\mathrm{ave}\{Y(\omega,n)\} = \alpha \times \mathrm{ave}\{Y(\omega,n-1)\} + (1-\alpha) \times Y(\omega,n)$$

$\alpha$: VALUE CLOSE TO ONE, FOR EXAMPLE, $\alpha = 0.99$

FIG. 11C $$V(\omega) = \mathrm{ave}\{|H(\omega)|^2\} - \{\mathrm{ave}|H(\omega)|\}^2$$

$$\mathrm{ave}\{|H(\omega)|^2\} = \alpha \times \mathrm{ave}_{old}\{|H(\omega)|^2\} + (1-\alpha) \times |H(\omega)|^2$$

$$\{\mathrm{ave}|H(\omega)|\}^2 = [\alpha \times \mathrm{ave}_{old}|H(\omega)| + (1-\alpha) \times |H(\omega)|]^2$$

$\mathrm{ave}|H(\omega)|$ IS TIME AVERAGE OF $|H(\omega)|$ UP TO CURRENT FRAME $\mathrm{ave}_{old}|H(\omega)|$ IS TIME AVERAGE OF $|H(\omega)|$ UP TO PRECEDING FRAME $\alpha$: VALUE CLOSE TO ONE, FOR EXAMPLE, $\alpha = 0.9$ OR $0.99$

FIG. 11D $$\begin{cases} H13(\omega) + C3(\omega) \times H33(\omega) + C4(\omega) \times H43(\omega) = 0 \\ H14(\omega) + C3(\omega) \times H34(\omega) + C4(\omega) \times H44(\omega) = 0 \end{cases}$$

H13(ω): TRANSFER FUNCTION BETWEEN FIRST LOUD SPEAKER 6a AND THIRD MICROPHONE 7c

H14(ω): TRANSFER FUNCTION BETWEEN FIRST LOUD SPEAKER 6a AND FOURTH MICROPHONE 7d

H33(ω): TRANSFER FUNCTION BETWEEN THIRD LOUD SPEAKER 6c AND THIRD MICROPHONE 7c

H34(ω): TRANSFER FUNCTION BETWEEN THIRD LOUD SPEAKER 6c AND FOURTH MICROPHONE 7d

H43(ω): TRANSFER FUNCTION BETWEEN FOURTH LOUD SPEAKER 6d AND THIRD MICROPHONE 7c

H44(ω): TRANSFER FUNCTION BETWEEN FOURTH LOUD SPEAKER 6d AND FOURTH MICROPHONE 7d

FIG. 11E $$\text{TRANSFER FUNCTION CHANGING RATE} = \frac{1}{n}\sum_{i=1}^{n} |\bar{x} - x_i|$$

$x = \{x_1, x_2, \cdots, x_n\}$ $\bar{x}$ : AVERAGE OF x

NOISE SUPPRESSING DEVICE, NOISE SUPPRESSING METHOD, AND RECORDING MEDIUM

CROSS-REFERENCE TO RELATED APPLICATIONS

This application is based upon and claims the benefit of priority of the prior Japanese Patent Application No. 2009-42620, filed on Feb. 25, 2009, the entire contents of which are incorporated herein by reference.

FIELD

The present embodiments relate to a noise suppressing device and a noise suppressing method for suppressing noise components other than speech components included in received sound signals, and a recording medium.

BACKGROUND

Noise suppressing devices such as an active noise controller and an echo canceller exist (refer to, for example, Japanese Unexamined Patent Application Publication Nos. 8-123444 and 10-207473). When noise occurs, such noise suppressing devices suppress the noise by generating sounds canceling the noise other than voices.

In general, in an active noise controller, error microphones and loud speakers outputting canceling sounds canceling noise are disposed at given positions. An active noise controller obtains the respective transfer characteristics of sounds (noise) between noise sources and error microphones on the basis of sound signals output from the noise sources and sound signals obtained by the error microphones. Then, the active noise controller generates canceling sounds minimizing sounds (noise) obtained by the error microphones on the basis of the obtained transfer characteristics. The active noise controller outputs such canceling sounds from loud speakers to suppress noise received at the respective positions of the error microphones by using the canceling sounds from the loud speakers.

SUMMARY

According to an aspect of the invention, a noise suppressing device that suppresses a noise component included in received sounds includes a plurality of sound input units that input sounds from a given sound source and convert the sounds to sound signals on a time axis, a transfer characteristic obtaining unit that performs frequency transform of the sound signals after dividing the sound signals into units of a frame and calculates respective transfer characteristics of the sounds transmitted from the sound source for each given frequency band, a storage unit that stores the transfer characteristics of the sounds calculated for the frequency band, a frequency obtaining unit that obtains a frequency for updating the transfer characteristics stored in the storage unit for the frequency band; an updating unit that updates the transfer characteristics stored in the storage unit every given number of frames corresponding to the obtained frequency based on the transfer characteristics for the frequency band, a generating unit that generates suppression information for suppressing the noise component based on the updated transfer characteristics, and a suppression unit that suppresses the noise component based on the suppression information generated by the generating unit.

The object and advantages of the embodiment discussed herein will be realized and attained by means of elements and combinations particularly pointed out in the claims.

It is to be understood that both the foregoing general description and the following detailed and the following detailed description are exemplary and only are not restrictive exemplary explanatory are not restrictive of the invention, as claimed.

BRIEF DESCRIPTION OF DRAWINGS

FIG. 3 is a diagram representing an exemplary content stored in an update frequency table;

FIGS. 11A and 11B are lists of equations 2 and equations 3 representing exemplary calculation of spectra obtained by averaging the 0th to (N−1)th frames;

FIG. 11C is a list of equations 4 that are exemplary equations used by a transfer function changing rate calculating unit to calculate a transfer function changing rate;

FIG. 11D is a list of equations 5 that are exemplary equations used by a transfer function changing rate calculating unit to calculate a transfer function changing rate; and FIG. 11E is an equation 6 used by a transfer function changing rate calculating unit to calculate the variance of values of a transfer function over time.

DESCRIPTION OF EMBODIMENTS

In a known active noise controller, when the number of noise sources and the number of set error microphones increase, the number of paths between the individual noise sources and the individual error microphones increases. Since the active noise controller obtains the respective transfer characteristics of sounds between the individual noise sources and the individual error microphones, as the number of transfer paths of sounds increases, the number of transfer characteristics to be obtained also increases. Moreover, since the active noise controller generates canceling sounds based on the obtained transfer characteristics, the number of canceling sounds to be generated also increases. In this manner, when the number of transfer characteristics to be obtained and the number of canceling sounds to be generated increase, it is difficult to calculate transfer characteristics and generate canceling sounds in real time.

Moreover, when sound signals are output from a plurality of loud speakers as a plurality of noise sources, which of the sounds comes from which of the loud speakers needs to be inferred. However, when the correlation between the sound signals output from the individual loud speakers is high, it is very difficult to correctly infer which of the sounds comes from which of the loud speakers.

When which of the sounds comes from which of the loud speakers cannot be correctly inferred, the respective transfer characteristics of sounds between the noise sources and error microphones cannot be appropriately obtained. Thus, it is also difficult to generate canceling sounds appropriately suppressing noise.

Since a noise suppressing device disclosed in the application concerned changes the frequency of updating the transfer characteristics of a sound transmitted from a given sound source for each given frequency band, the noise suppressing device does not update the transfer characteristics in each frequency band for each frame. Thus, processing load caused by calculation and updating of the transfer characteristics is reduced.

The noise suppressing device, a noise suppressing method, and a recording medium will now be described in detail based on the drawings depicting embodiments applied to a car audio device. In each of the following embodiments, music and voices output from a car audio device are suppressed as noise in a given area in a vehicle.

First Embodiment

Figure 1:
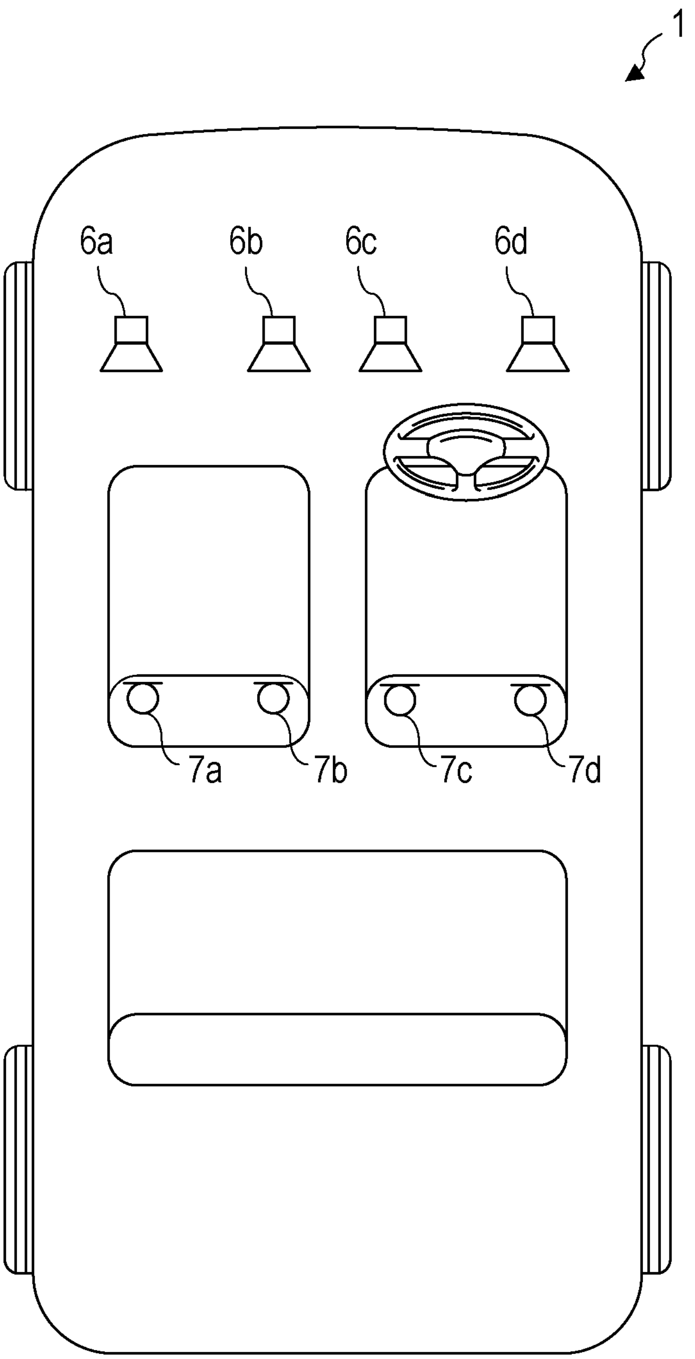
FIG. 1 is a diagram illustrating an example of a car audio device installed according to a first embodiment.

A car audio device according to a first embodiment will now be described. FIG. 1 is a diagram illustrating an example of the car audio device installed according to the first embodiment. In the car audio device 1 according to the first embodiment, four loud speakers outputting audio signals are disposed at appropriate positions in front of a passenger seat and a driver seat. In the first embodiment, for example, a first loud speaker 6*a* is disposed at the front left of the passenger seat, a second loud speaker 6*b* is disposed at the front right of the passenger seat, a third loud speaker 6*c* is disposed at the front left of the driver seat, and a fourth loud speaker 6*d* is disposed at the front right of the driver seat.

Moreover, in the car audio device 1 according to the first embodiment, four microphones are disposed at appropriate positions on the passenger seat and the driver seat. The four microphones are disposed at positions to be near the ears of a passenger in the passenger seat and the ears of a driver in the driver seat when the passenger and the driver are sitting in the seats. In the first embodiment, a first microphone 7*a* is disposed at an area at the left end of the headrest of the passenger seat, a second microphone 7*b* is disposed at an area at the right end of the headrest of the passenger seat, a third microphone 7*c* is disposed at an area at the left end of a headrest of the driver seat, and a fourth microphone 7*d* is disposed at an area at the right end of the headrest of the driver seat. In this case, the microphones 7*a*, 7*b*, 7*c*, and 7*d* may be disposed at appropriate positions, for example, on the ceiling above a passenger and a driver instead of the respective headrests of the passenger seat and the driver seat.

The main body of the car audio device 1 may be disposed, for example, under a seat. The loud speakers 6*a*, 6*b*, 6*c*, and 6*d* and the microphones 7*a*, 7*b*, 7*c*, and 7*d* are connected to the main body of the car audio device 1 via, for example, a cable. Positions where the loud speakers 6*a*, 6*b*, 6*c*, and 6*d* and the microphones 7*a*, 7*b*, 7*c*, and 7*d* are disposed are not limited to the examples illustrated in FIG. 1.

The car audio device 1 according to the first embodiment causes a group of the first loud speaker 6*a* and the second loud speaker 6*b* and another group of the third loud speaker 6*c* and the fourth loud speaker 6*d* to output different types of audio signals. Audio signals output from the first loud speaker 6*a* and the second loud speaker 6*b* are directed toward a passenger in the passenger seat. Audio signals output from the third loud speaker 6*c* and the fourth loud speaker 6*d* are directed toward a driver.

For example, since voice messages from a car navigation system are desirably delivered toward a driver, sound signals output from the car navigation system are output from the third loud speaker 6*c* and the fourth loud speaker 6*d*. Moreover, sound signals of music and voices that a passenger in the passenger seat may desire to hear are output from the first loud speaker 6*a* and the second loud speaker 6*b*.

In this case, since sounds (music and voices) output from the first loud speaker 6*a* and the second loud speaker 6*b* may be undesired noise for a driver, the car audio device 1 suppresses the loudness level of the sounds from the first loud speaker 6*a* and the second loud speaker 6*b* audible to the driver. Moreover, since sounds (voice messages) output from the third loud speaker 6*c* and the fourth loud speaker 6*d* may be undesired noise for a passenger in the passenger seat, the car audio device 1 suppresses the loudness level of the sounds from the third loud speaker 6*c* and the fourth loud speaker 6*d* audible to the passenger.

The car audio device 1 according to the first embodiment generates canceling filters for suppressing the loudness level of sounds from the first loud speaker 6*a* and the second loud speaker 6*b* audible to a driver. The car audio device 1 performs filtering on audio signals to be output from the first loud speaker 6*a* and the second loud speaker 6*b*, using the generated canceling filters, to generate canceling signals for suppressing the loudness level of sounds from the first loud speaker 6*a* and the second loud speaker 6*b*. The car audio device 1 superimposes the generated canceling signals on audio signals to be output from the third loud speaker 6*c* and the fourth loud speaker 6*d* to output superimposed signals from the third loud speaker 6*c* and the fourth loud speaker 6*d*.

Thus, the car audio device 1 may output, from the third loud speaker 6*c* and the fourth loud speaker 6*d*, canceling sounds suppressing, at the position of a driver, sounds output from the first loud speaker 6*a* and the second loud speaker 6*b*. The details of the process of suppressing, at the position of a driver, sounds output from the first loud speaker 6*a* and the second loud speaker 6*b*, using canceling sounds, will be described below.

Moreover, the car audio device 1 according to the first embodiment generates canceling filters for suppressing the loudness level of sounds from the third loud speaker 6*c* and the fourth loud speaker 6*d* audible to a passenger in the passenger seat. The car audio device 1 performs filtering on audio signals to be output from the third loud speaker 6*c* and the fourth loud speaker 6*d*, using the generated canceling filters, to generate canceling signals for suppressing the loudness level of sounds from the third loud speaker 6*c* and the fourth loud speaker 6*d*. The car audio device 1 superimposes the generated canceling signals on audio signals to be output from the first loud speaker 6*a* and the second loud speaker 6*b* to output superimposed signals from the first loud speaker 6*a* and the second loud speaker 6*b*.

Thus, the car audio device 1 may output, from the first loud speaker 6*a* and the second loud speaker 6*b*, canceling sounds suppressing, at the position of a passenger in the passenger seat, sounds output from the third loud speaker 6*c* and the fourth loud speaker 6*d*. The details of the process of suppressing, at the position of a passenger, sounds output from the third loud speaker 6*c* and the fourth loud speaker 6*d*, using canceling sounds, will be described below.

Figure 2:
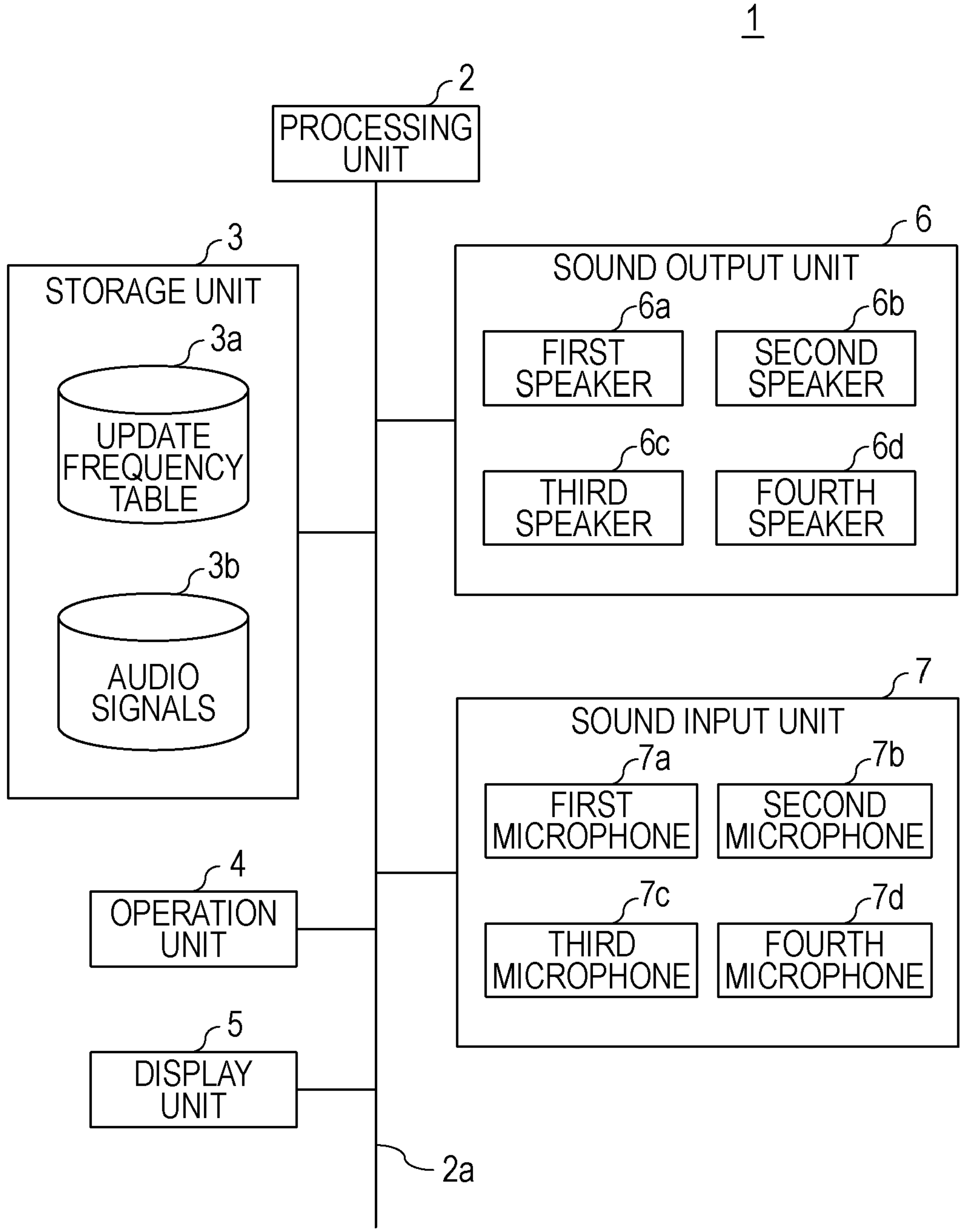
FIG. 2 is a block diagram depicting an exemplary configuration of the car audio device according to the first embodiment.

FIG. 2 is a block diagram depicting an exemplary configuration of the car audio device 1 according to the first embodiment. The car audio device 1 according to the first embodiment includes, for example, a processing unit 2, a storage unit 3, an operation unit 4, a display unit 5, a sound output unit 6, and a sound input unit 7. The aforementioned hardware components are connected to each other via a bus 2*a*.

The processing unit 2 may be, for example, a central processing unit (CPU) or a micro processing unit (MPU). The processing unit 2 controls the operations of hardware components and executes control programs stored in the storage unit 3. The storage unit 3 stores, for example, various control programs to cause the car audio device 1 to operate, an update frequency table 3*a* as represented in FIG. 3, and various audio signals 3*b* in advance in FIG. 2. The audio signals 3*b* may not be stored in the storage unit 3 and may be read from a loaded medium such as a Compact Disc (CD) on which the audio signals 3*b* are recorded.

The operation unit 4 includes various operation keys for a user to operate the car audio device 1. When the user operates each of the operation keys, the operation unit 4 sends a control signal corresponding to the operated operation key to the processing unit 2. Then, the processing unit 2 performs processing corresponding to the control signal obtained from the operation unit 4.

The display unit 5 may be, for example, a liquid crystal display and displays the operating state of the car audio device 1, information to be delivered to the user, and the like in response to an instruction from the processing unit 2.

The sound output unit 6 includes, for example, the four loud speakers 6*a*, 6*b*, 6*c*, and 6*d*, four digital-to-analog converters (not shown), and four amplifiers (not shown). The sound output unit 6 converts digital sound signals to be output to analog sound signals, using the digital-to-analog converters, in response to an instruction from the processing unit 2. Then, the sound output unit 6 amplifies the analog sound signals, using the amplifiers, and outputs sounds based on the amplified sound signals from the loud speakers 6*a*, 6*b*, 6*c*, and 6*d*.

The sound input unit 7 includes, for example, the four microphones (sound receiving units) 7*a*, 7*b*, 7*c*, and 7*d*, four amplifiers (not shown), and four analog-to-digital converters (not shown). The microphones 7*a*, 7*b*, 7*c*, and 7*d* are, for example, capacitor microphones and generate analog sound signals based on received sounds. The amplifiers are, for example, gain amplifiers and amplify sound signals generated by the microphones 7*a*, 7*b*, 7*c*, and 7*d*.

The analog-to-digital converters sample the sound signals amplified by the amplifiers at a given sampling rate and filtered using such as a low pass filter (LPF), to convert the amplified sound signals to digital sound signals. For example, the sound input unit 7 causes the storage unit 3 to store the digital sound signals converted by the analog-to-digital converters.

FIG. 3 is a diagram representing content stored in the update frequency table 3*a*. Correspondences between transfer function changing rates and update frequencies are stored in the update frequency table 3*a* for each of four divided frequency bands ($0 \leq \omega < 64$, $64 \leq \omega < 128$, $128 \leq \omega < 192$, and $192 \leq \omega < 256$), as represented in FIG. 3. In this case, w is a frequency, and the update frequency table 3*a* represented in FIG. 3 represents a case where the number of frequency bins after frequency transform is 256. The number of divided frequency bands and a method for dividing frequency bands are not limited to this case.

Transfer function changing rates represent the rates of change of transfer functions of sounds between the loud speakers 6*a*, 6*b*, 6*c*, and 6*d* and the microphones 7*a*, 7*b*, 7*c*, and 7*d* over time. In the update frequency table 3*a* represented in FIG. 3, transfer function changing rates are divided into a plurality of ranges, and update frequencies corresponding to the individual ranges are stored.

Update frequencies represent the frequencies of updating the transfer functions of sounds between the loud speakers 6*a*, 6*b*, 6*c*, and 6*d* and the microphones 7*a*, 7*b*, 7*c*, and 7*d*. In the update frequency table 3*a* represented in FIG. 3, the number of frames included in each of the intervals, each of the transfer functions being changed at the intervals, is stored as an update frequency. That is, for example, regarding the frequency band of $0 \leq \omega < 64$, when the transfer function changing rate is equal to or more than 1.5 and less than 5.0, the transfer function for a frequency component within this frequency band is updated once every two frames.

In the update frequency table 3*a*, the higher the transfer function changing rate is, the smaller the stored number of frames is, and the lower the transfer function changing rate is, the larger the stored number of frames is. That is, in the update frequency table 3*a*, the higher the transfer function changing rate is, the higher the stored update frequency (the stored number of frames) is. The content stored in the update frequency table 3*a* may be stored in advance before the car audio device 1 is shipped from a factory or before a vehicle including the car audio device 1 is shipped from a factory. Alternatively, the content stored in the update frequency table 3*a* may be changed by the user of the car audio device 1. The transfer functions of sounds between the loud speakers 6*a*, 6*b*, 6*c*, and 6*d* and the microphones 7*a*, 7*b*, 7*c*, and 7*d* are used when canceling filters for suppressing noise included in sound signals obtained by the microphones 7*a*, 7*b*, 7*c*, and 7*d* are generated.

Figure 4:
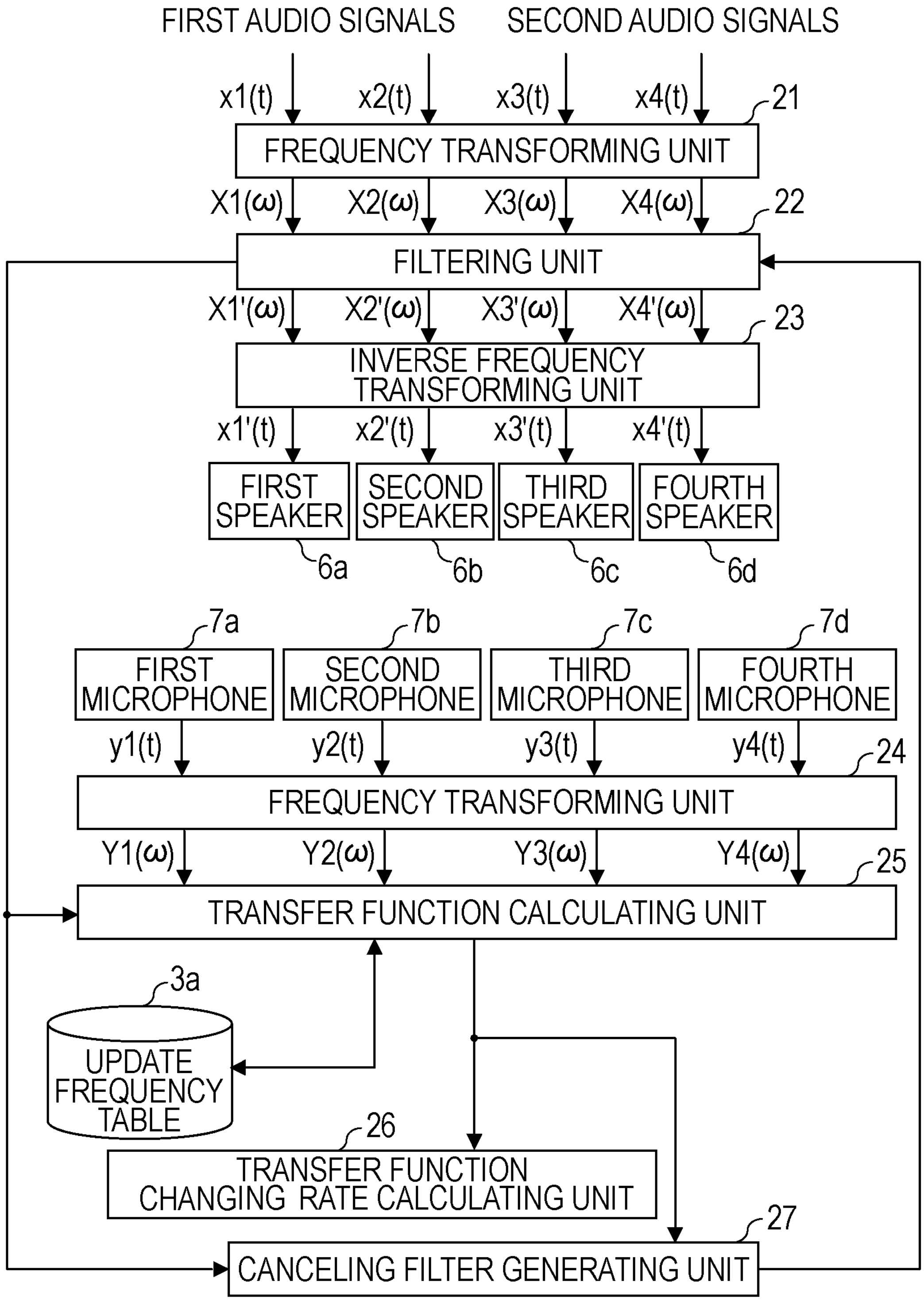
FIG. 4 is a functional block diagram depicting exemplary functional components of the car audio device according to the first embodiment.

The functions of the car audio device 1 according to the first embodiment will next be described. The functions of the car audio device 1 are implemented by the processing unit 2 executing the various control programs stored in the storage unit 3 in the car audio device 1. FIG. 4 is a functional block diagram depicting exemplary functional components of the car audio device 1 according to the first embodiment. In the car audio device 1 according to the first embodiment, the processing unit 2 implements the respective functions of a frequency transforming unit 21, a filtering unit 22, an inverse frequency transforming unit 23, a frequency transforming unit 24, a transfer function calculating unit 25, a transfer function changing rate calculating unit 26, a canceling filter generating unit 27, and the like by executing the control programs stored in the storage unit 3.

In this case, an arrangement for implementing these functions is not limited to implementing the functions by the processing unit 2 executing the control programs stored in the storage unit 3. For example, these functions may be implemented via a digital signals processor (DSP) into which computer programs and various types of data disclosed in the application concerned are built.

The car audio device 1 according to the first embodiment outputs first audio signals x1(*t*) and x2(*t*) from the first loud speaker 6*a* and the second loud speaker 6*b* and second audio signals x3(*t*) and x4(*t*) from the third loud speaker 6*c* and the fourth loud speaker 6*d*. The microphones 7*a*, 7*b*, 7*c*, and 7*d* receive sounds output from the loud speakers 6*a*, 6*b*, 6*c*, and 6*d*. The car audio device 1 suppresses, at the positions of the third microphone 7*c* and the fourth microphone 7*d*, sounds output from the first loud speaker 6*a* and the second loud speaker 6*b* and suppresses, at the positions of the first microphone 7*a* and the second microphone 7*b*, sounds output from the third loud speaker 6*c* and the fourth loud speaker 6*d*.

The frequency transforming unit 21 reads, from the storage unit 3, the first audio signals x1(*t*) and x2(*t*) to be output from the first loud speaker 6*a* and the second loud speaker 6*b* and the second audio signals x3(*t*) and x4(*t*) to be output from the third loud speaker 6*c* and the fourth loud speaker 6*d*. The frequency transforming unit 21 extracts the audio signals x1(*t*), x2(*t*), x3(*t*), and x4(*t*) on the time axis for each frame based on a given frame length and a given frame period and performs windowing on the audio signals x1(*t*), x2(*t*), x3(*t*), and x4(*t*), using, for example, a Hamming window. The frequency transforming unit 21 performs frequency transform of the audio signals subjected to windowing for each frame to transform the audio signals subjected to windowing into audio signals (spectra) on the frequency axis.

The frequency transforming unit 21 sends, to the filtering unit 22, the spectra X1(ω), X2(ω), X3(ω), and X4(ω) obtained by performing frequency transform. The frequency transforming unit 21 performs, for example, time-frequency transform such as fast Fourier transform (FFT). In this case, X1(ω)={X10(ω), X11(ω), . . . , X1N−1(ω)} where N is the number of frames, and w is a frequency. For example, X10(ω) is the spectrum of the audio signal x1(*t*) in the 0th frame.

The filtering unit 22 performs filtering on the spectra X1(ω), X2(ω), X3(ω), and X4(ω) obtained from the frequency transforming unit 21, using filters generated by the canceling filter generating unit 27 described below. The filtering unit 22 generates, by this operation, canceling signals (canceling sounds) for canceling, at the respective positions of the microphones 7*a*, 7*b*, 7*c*, and 7*d*, sounds output from the loud speakers 6*a*, 6*b*, 6*c*, and 6*d*.

Then, the filtering unit 22 superimposes the generated canceling signals on the spectra X1(ω), X2(ω), X3(ω), and X4(ω) (audio signals) obtained from the frequency transforming unit 21 and sends obtained spectra X1'(ω), X2'(ω), X3'(ω), and X4'(ω) to the inverse frequency transforming unit 23. The filtering unit 22 further sends the generated spectra X1'(ω), X2'(ω), X3'(ω), and X4'(ω) to the transfer function calculating unit 25 and the canceling filter generating unit 27. In this case, inverse frequency transform of the respective spectra of a playback signal and a canceling signal may be individually performed, and superimposition may be performed, using signals in the time domain.

Specifically, the filtering unit 22 generates canceling signals to be output from the third loud speaker 6*c* and the fourth loud speaker 6*d* to cancel (suppress), at the position of the third microphone 7*c*, a sound output from the first loud speaker 6*a*. Similarly, the filtering unit 22 generates canceling signals to be output from the third loud speaker 6*c* and the fourth loud speaker 6*d* to cancel (suppress), at the position of the third microphone 7*c*, a sound output from the second loud speaker 6*b*. In this case, the canceling filter generating unit 27 generates canceling filters for the filtering unit 22 to generate the canceling signals.

The filtering unit 22 superimposes, on the second audio signal to be output from the third loud speaker 6*c*, the two canceling signals to be output from the third loud speaker 6*c* to cancel, at the position of the third microphone 7*c*, sounds output from the first loud speaker 6*a* and the second loud speaker 6*b*. Moreover, the filtering unit 22 superimposes, on the second audio signal to be output from the fourth loud speaker 6*d*, the two canceling signals to be output from the fourth loud speaker 6*d* to cancel, at the position of the third microphone 7*c*, sounds output from the first loud speaker 6*a* and the second loud speaker 6*b*.

Similarly, the filtering unit 22 generates canceling signals to be output from the third loud speaker 6*c* and the fourth loud speaker 6*d* to cancel, at the position of the fourth microphone 7*d*, sounds output from the first loud speaker 6*a* and the second loud speaker 6*b*. Then, the filtering unit 22 superimposes the generated canceling signals on the second audio signals to be output from the third loud speaker 6*c* and the fourth loud speaker 6*d*. In addition to the second audio signals, canceling signals for canceling the first audio signals are also output from the third loud speaker 6*c* and the fourth loud speaker 6*d* by superimposing the canceling signals on the second audio signals.

Moreover, the filtering unit 22 generates canceling signals to be output from the first loud speaker 6*a* and the second loud speaker 6*b* to cancel, at the position of the first microphone 7*a* or the second microphone 7*b*, sounds to be output from the third loud speaker 6*c* and the fourth loud speaker 6*d*. Then, the filtering unit 22 superimposes the generated canceling signals on the first audio signals to be output from the first loud speaker 6*a* and the second loud speaker 6*b*.

In addition to the first audio signals, canceling signals for canceling the second audio signals are also output from the first loud speaker 6*a* and the second loud speaker 6*b* by superimposing the canceling signals on the first audio signals. The filtering unit 22 sends the audio signals (spectra) X1'(ω), X2'(ω), X3'(ω), and X4'(ω), on which the generated canceling signals are superimposed, to the inverse frequency transforming unit 23.

The inverse frequency transforming unit 23 performs inverse frequency transform (for example, inverse fast Fourier transform) of the spectra X1'(ω), X2'(ω), X3'(ω), and X4'(ω) obtained from the filtering unit 22 to transform the spectra X1'(ω), X2'(ω), X3'(ω), and X4'(ω) into playback signals x1'(t), x2'(t), x3'(t), and x4'(t) on the time axis. The inverse frequency transforming unit 23 outputs the generated playback signals x1'(t), x2'(t), x3'(t), and x4'(t) from the loud speakers 6*a*, 6*b*, 6*c*, and 6*d*, respectively. Although not shown, the individual audio signals x1'(t), x2'(t), x3'(t), and x4'(t) are output respectively from the loud speakers 6*a*, 6*b*, 6*c*, and 6*d* after being converted to analog sound signals by the digital-to-analog converters and then being amplified by the amplifiers.

In a state in which audio signals are being output from the loud speakers 6*a*, 6*b*, 6*c*, and 6*d* by the aforementioned operations, the microphones 7*a*, 7*b*, 7*c*, and 7*d* receive sounds. The microphones 7*a*, 7*b*, 7*c*, and 7*d* send, to the frequency transforming unit 24, sound signals y1(*t*), y2(*t*), y3(*t*), and y4(*t*) obtained by receiving the sounds. Although not shown, in detail, the amplifiers amplify analog sound signals obtained by the microphones 7*a*, 7*b*, 7*c*, and 7*d*, and the analog-to-digital converters sample the amplified analog sound signals at a given sampling rate to convert the amplified analog sound signals to digital sound signals. Then, the digital sound signals are sent to the frequency transforming unit 24. In this case, t is the number of samples, and y1(*t*), y2(*t*), y3(*t*), and y4(*t*) represent signals sampled at the given sampling rate.

The frequency transforming unit 24 obtains the sound signals y1(*t*), y2(*t*), y3(*t*), and y4(*t*) obtained by the sound input unit 7. The frequency transforming unit 24 divides the sound signals y1(*t*), y2(*t*), y3(*t*), and y4(*t*) on the time axis in units of a frame based on a given frame length and a given frame period and performs windowing, using, for example, a Hamming window. The frequency transforming unit 24 performs frequency transform of the sound signals subjected to windowing for each frame to transform the sound signals subjected to windowing into sound signals (spectra) on the frequency axis. The frequency transforming unit 24 sends, to the transfer function calculating unit 25, the spectra Y1(ω), Y2(ω), Y3(ω), and Y4(ω) obtained by performing frequency transform. The frequency transforming unit 24 performs, for example, time-frequency transform such as fast Fourier transform, as is the case with the frequency transforming unit 21.

Regarding each of the given number (for example, four) of frequency bands into which the entire frequency band of each frame is divided in advance, the transfer function calculating unit 25 determines whether transfer functions in a frequency component included in the frequency band are to be updated. The transfer function changing rate calculating unit 26 described below calculates, based on transfer functions calculated by the transfer function calculating unit 25 for each frequency component, the rates of change of the transfer functions over time (hereinafter called the transfer function changing rates RC(ω)) for the frequency component. The transfer function changing rate calculating unit 26 further averages the transfer function changing rates calculated for each frequency component in each of the four divided frequency bands in the frequency direction and stores the average as the transfer function changing rate RC(ω) for the frequency band in the storage unit 3.

Thus, the transfer function calculating unit 25 determines, based on the transfer function changing rate RC(ω) stored in the storage unit 3, whether transfer functions in a frequency component included in each frequency band are to be updated. Specifically, the transfer function calculating unit 25 reads, based on the transfer function changing rate RC(ω) in each frequency band stored in the storage unit 3, an update frequency corresponding to the transfer function changing rate RC(ω) in the frequency band from the content stored in the update frequency table 3*a*. For example, when the transfer function changing rate RC(ω) for the frequency band of $0 \leq \omega < 64$ is 1.0, the transfer function calculating unit 25 reads the number of frames "3" as the update frequency from the update frequency table 3*a*.

Figure 5:
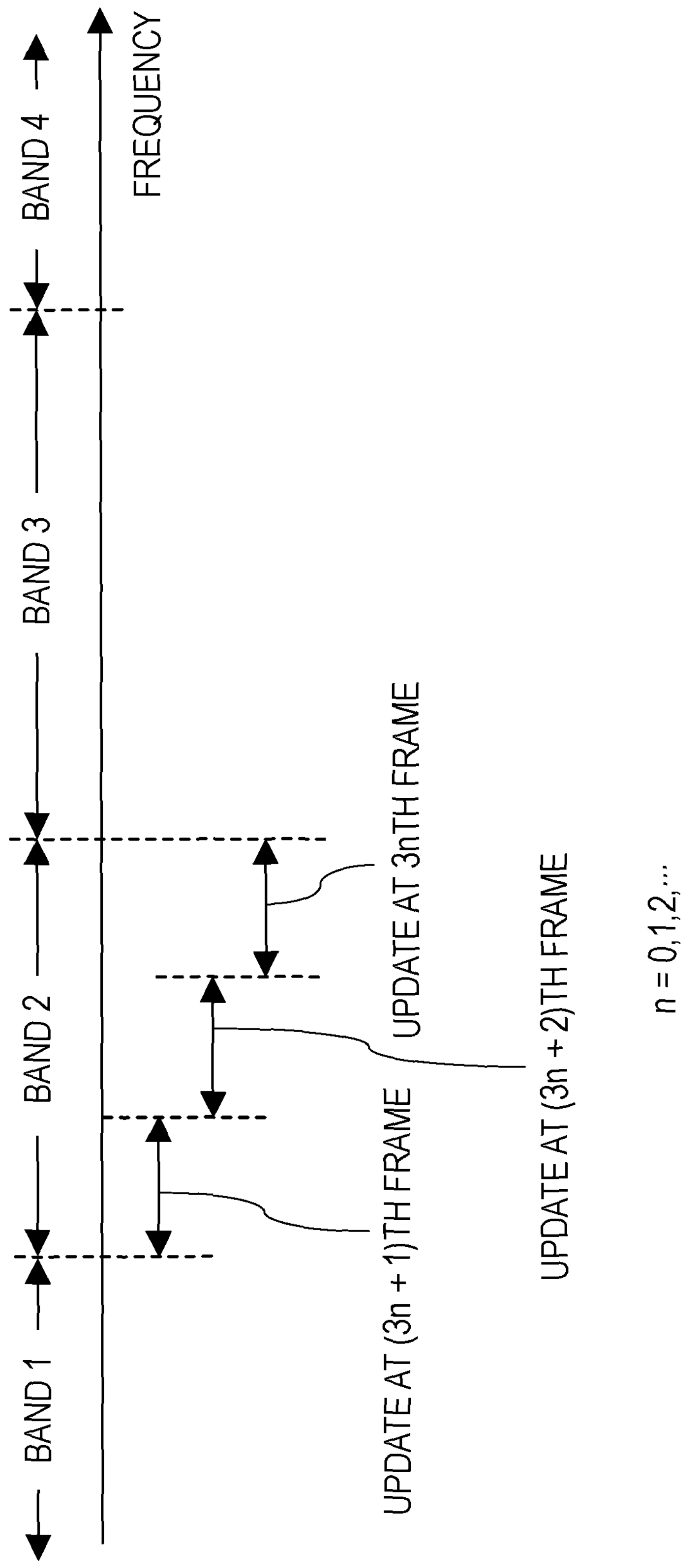
FIG. 5 is a diagram describing an exemplary process of updating transfer functions.

In this case, the transfer function calculating unit 25 decides to update transfer functions in the frequency band of $0 \leq \omega < 64$ once every three frames. FIG. 5 is a diagram describing an example of the process of updating transfer functions. FIG. 5 depicts an exemplary update process when transfer functions in a frequency band indicated by a band 2 are updated once every three frames. The transfer function calculating unit 25 decides to divide the frequency band indicated by the band 2 into three frequency bands and update transfer functions in the divided frequency bands in ascending order of the frequency component while shifting the position of a frame at which transfer functions are updated by one frame.

That is, the transfer function calculating unit 25 decides to update, at the (3n+1)th frame (n=0, 1, 2, . . . ), transfer functions in a band in which a frequency component is smallest in the frequency band indicated by the band 2.

The transfer function calculating unit 25 further decides to update, at the (3n+2)th frame, transfer functions in a band in which a frequency component takes an intermediate value in the frequency band indicated by the band 2. The transfer function calculating unit 25 further decides to update, at the (3n)th frame, transfer functions in a band in which a frequency component is largest in the frequency band indicated by the band 2.

In this case, the transfer function calculating unit 25 stores, in the storage unit 3, an update frequency in each frequency band and information indicating one of the frequency bands in which transfer functions have been just updated, the frequency bands being obtained by dividing the frequency band by a number based on the update frequency. Thus, the transfer function calculating unit 25 determines, based on the content stored in the storage unit 3, whether or not transfer functions in any of the frequency components included in the individual frequency bands are to be updated.

Regarding a frequency component the transfer functions determined to be updated, the transfer function calculating unit 25 calculates the respective transfer functions (transfer characteristics) of sounds between the loud speakers 6*a*, 6*b*, 6*c*, and 6*d* and the microphones 7*a*, 7*b*, 7*c*, and 7*d* based on the spectra X1'(ω), X2'(ω), X3'(ω), and X4'(ω) of audio signals obtained from the filtering unit 22 and the spectra Y1(ω), Y2(ω), Y3(ω), and Y4(ω) of sound signals obtained from the frequency transforming unit 24. The transfer function calculating unit 25 calculates a transfer function based on, for example, the following equation 1:

$$H(\omega)=Y(\omega)/X'(\omega) \quad \text{[E1]}$$

H(ω): transfer function

Y(ω): spectrum (Y1(ω), Y2(ω), Y3(ω), or Y4(ω)) of sound signal received by microphone X'(ω): spectrum (X1'(ω), X2'(ω), X3'(ω), or X4'(ω)) of audio signal output from loud speaker That is, for example, a transfer function H11(ω) between the first loud speaker 6*a* and the first microphone 7*a* is calculated from H11(ω)=Y1(ω)/X1'(ω) based on the audio signal X1'(ω) output from the first loud speaker 6*a* and the sound signal Y1(ω) obtained by the first microphone 7*a*. Moreover, a transfer function H12(ω) between the first loud speaker 6*a* and the second microphone 7*b* is calculated from H12(ω)=Y2(ω)/X1'(ω) based on the audio signal X1'(ω) output from the first loud speaker 6*a* and the sound signal Y2(ω) obtained by the second microphone 7*b*.

In this case, transfer functions may be calculated, using, instead of the spectra X1'(ω), X2'(ω), X3'(ω), and X4'(ω) of audio signals and the spectra Y1(ω), Y2(ω), Y3(ω), and Y4(ω) of sound signals, average spectra ave{X'(ω)} and ave{Y(ω)} that are the respective averages of the spectra X'(ω) and Y(ω) over time. In this case, the transfer function calculating unit 25 calculates transfer functions based on H(ω)=ave{Y(ω)}/ave{X'(ω)}.

For example, equations 2 in FIG. 11A or equations 3 in FIG. 11B may be used as a method for calculating the average spectra ave{X'(ω)} and ave{Y(ω)}, which are the averages over time.

Equations 2 in FIG. 11A and equations 3 in FIG. 11B illustrate exemplary calculations of spectra obtained by averaging the 0th to (N−1)th frames.

Regarding each frequency component the transfer functions determined to be updated in each frame, the transfer function calculating unit (an updating unit) 25 calculates the respective transfer functions of sounds between the loud speakers 6*a*, 6*b*, 6*c*, and 6*d* and the microphones 7*a*, 7*b*, 7*c*, and 7*d* and stores the transfer functions in the storage unit 3. The transfer function calculating unit 25 sends the calculated transfer functions to the transfer function changing rate calculating unit 26 and the canceling filter generating unit 27 one by one. Alternatively, after the transfer function calculating unit 25 starts the operation, the transfer function calculating unit 25 may only perform calculation of transfer functions until a given number of transfer functions are accumulated. After the given number of transfer functions is accumulated, the transfer function calculating unit 25 may start to send the calculated transfer functions.

The transfer function changing rate calculating unit 26 calculates, based on the transfer functions calculated by the transfer function calculating unit 25 for each frequency component, the respective rates of change of the transfer functions over time (the transfer function changing rates RC(ω)) for the frequency component and stores the transfer function changing rates RC(ω) in the storage unit 3.

The transfer function changing rate calculating unit 26 according to the first embodiment calculates a variance V(ω) of values of a transfer function up to the current frame over time as the transfer function changing rate RC(ω) for each frequency component. The transfer function changing rate calculating unit 26 calculates the variance V(ω) of values of a transfer function over time based on, for example, equations 4 in FIG. 11C.

In this case, the transfer function changing rate calculating unit 26 may calculate, as the transfer function changing rate RC(ω), the standard deviation of values of a transfer function over time instead of the variance V(ω) of values of a transfer function over time.

The transfer function changing rate calculating unit 26 calculates the changing rates RC(ω) of the respective transfer functions of sounds between the loud speakers 6*a*, 6*b*, 6*c*, and 6*d* and the microphones 7*a*, 7*b*, 7*c*, and 7*d* for each frequency component. Then, the transfer function changing rate calculating unit 26 averages the transfer function changing rates RC(ω) between the loud speakers 6*a*, 6*b*, 6*c*, and 6*d* and the microphones 7*a*, 7*b*, 7*c*, and 7*d* in the frequency direction for each of the four frequency bands to calculate the transfer function changing rates RC(ω) for the individual frequency bands. The transfer function changing rate calculating unit 26 stores the transfer function changing rates RC(ω) calculated for each of the four frequency bands in the storage unit 3.

For each frequency component, the canceling filter generating unit 27 generates, based on the transfer functions calculated by the transfer function calculating unit 25, canceling filters for generating canceling signals for suppressing, at the respective positions of the microphones 7*a*, 7*b*, 7*c*, and 7*d*, sounds output from the loud speakers 6*a*, 6*b*, 6*c*, and 6*d*.

The canceling filter generating unit 27 generates canceling filters by solving, for example, simultaneous equations depicted in equations 5 in FIG. 11D.

Equations 5 are equations for calculating canceling filters C3(ω) and C4(ω) to be used in filtering performed on audio signals to be output from the third loud speaker 6*c* and the fourth loud speaker 6*d* to suppress, at the respective positions of the third microphone 7*c* and the fourth microphone 7*d*, a sound output from the first loud speaker 6*a*.

The canceling filter generating unit 27 calculates, based on similar equations, canceling filters to be used in filtering performed on audio signals to be output from the third loud speaker 6*c* and the fourth loud speaker 6*d* to suppress, at the respective positions of the third microphone 7*c* and the fourth microphone 7*d*, a sound output from the second loud speaker 6*b*. Moreover, the canceling filter generating unit 27 calculates canceling filters to be used in filtering performed on audio signals to be output from the first loud speaker 6*a* and the second loud speaker 6*b* to suppress, at the respective positions of the first microphone 7*a* and the second microphone 7*b*, a sound output from the third loud speaker 6*c*. Moreover, the canceling filter generating unit 27 calculates canceling filters to be used in filtering performed on audio signals to be output from the first loud speaker 6*a* and the second loud speaker 6*b* to suppress, at the respective positions of the first microphone 7*a* and the second microphone 7*b*, a sound output from the fourth loud speaker 6*d*.

The canceling filter generating unit 27 sends the canceling filters generated for each frequency component to the filtering unit 22. The filtering unit 22 generates canceling signals based on the canceling filters obtained from the canceling filter generating unit 27 and outputs the generated canceling signals from the loud speakers 6*a*, 6*b*, 6*c*, and 6*d*.

The car audio device 1 according to the first embodiment updates, by the aforementioned process, the respective transfer functions of sounds between the loud speakers 6*a*, 6*b*, 6*c*, and 6*d* and the microphones 7*a*, 7*b*, 7*c*, and 7*d* at a frequency corresponding to a transfer function changing rate in each frequency band. That is, the car audio device 1 does not update the transfer functions between the loud speakers 6*a*, 6*b*, 6*c*, and 6*d* and the microphones 7*a*, 7*b*, 7*c*, and 7*d* for all frequency components in each frame. Thus, processing load caused by updating of transfer functions and processing load in generation of canceling filters are reduced.

Figure 6:
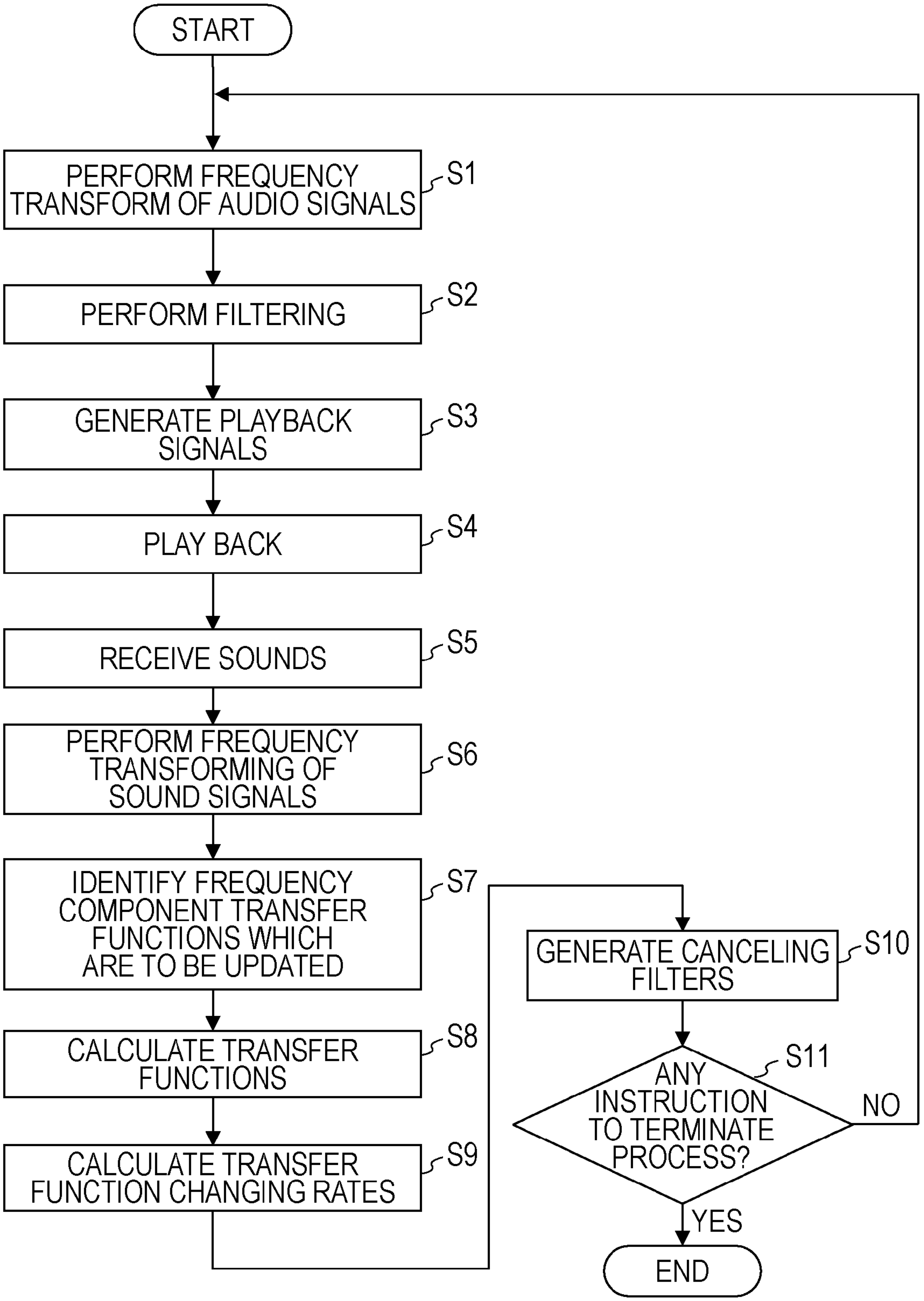
FIG. 6 is an operation chart representing an exemplary sequence of a noise suppressing process according to the first embodiment.

A noise suppressing process in the car audio device 1 according to the first embodiment will now be described based on an operation chart. FIG. 6 is an operation chart representing the sequence of the noise suppressing process according to the first embodiment. The following process is performed by the processing unit 2 according to the control programs stored in the storage unit 3 of the car audio device 1.

In operation S1, the processing unit 2 in the car audio device 1 performs frequency transform of audio signals to be output from the loud speakers 6*a*, 6*b*, 6*c*, and 6*d* to obtain audio signals (spectra) on the frequency axis. In operation S2, the processing unit 2 performs filtering on the spectra subjected to frequency transform, using given filters. The processing unit 2 generates, by filtering, canceling signals for canceling, at the respective positions of the microphones 7*a*, 7*b*, 7*c*, and 7*d*, sounds output from the loud speakers 6*a*, 6*b*, 6*c*, and 6*d* and superimposes the generated canceling signals on the spectra subjected to frequency transform in operation S1.

In operation S3, the processing unit 2 performs inverse frequency transform of the spectra, on which the canceling signals are superimposed, to generate playback signals to be output from the loud speakers 6*a*, 6*b*, 6*c*, and 6*d*. In operation S4, the processing unit 2 plays back the generated playback signals via the loud speakers 6*a*, 6*b*, 6*c*, and 6*d*. In operation S5, in a state in which the playback signals are being played back from the loud speakers 6*a*, 6*b*, 6*c*, and 6*d*, the processing unit 2 receives sounds via the microphones 7*a*, 7*b*, 7*c*, and 7*d* and obtains sound signals. In operation S6, the processing unit 2 performs frequency transform of the obtained sound signals to obtain sound signals (spectra) on the frequency axis.

In operation S7, the processing unit 2 reads, from the storage unit 3, a transfer function changing rate in each of the given number (for example, four) of frequency bands into which the entire frequency band is divided in advance and identifies, based on the read transfer function changing rate, a frequency component the transfer functions of which are to be updated in the frequency band. Specifically, the processing unit 2 reads, based on the transfer function changing rate in each frequency band stored in the storage unit 3, an update frequency corresponding to the transfer function changing rate in the frequency band from the content stored in the update frequency table 3*a*. The processing unit 2 divides each frequency band by a number based on the update frequency read from the update frequency table 3*a* and determines whether transfer functions of the frequency components in any of the divided frequency bands are to be updated or not.

In operation S8, regarding a frequency component the transfer functions of which are determined to be updated, the processing unit 2 calculates the respective transfer functions of sounds between the loud speakers 6*a*, 6*b*, 6*c*, and 6*d* and the microphones 7*a*, 7*b*, 7*c*, and 7*d* based on the spectra generated in operation S2 and the spectra generated in operation S6. In operation S9, the processing unit 2 calculates, based on the calculated transfer functions, the respective transfer function changing rates of the transfer functions for each frequency component. The processing unit 2 calculates, in the frequency direction, the average of the transfer function changing rates calculated for each frequency component in each of the four frequency bands and stores, in the storage unit 3, the calculated average as the transfer function changing rate in the frequency band. In this case, the processing unit 2 may start to calculate transfer function changing rates after accumulating a given number of transfer functions.

In operation S10, the processing unit 2 generates canceling filters based on the transfer functions calculated in operation S8, specifically, the transfer functions between the loud speakers 6*a*, 6*b*, 6*c*, and 6*d* and the microphones 7*a*, 7*b*, 7*c*, and 7*d*. Specifically, for a frequency component the transfer functions of which are determined in operation S7 to be updated, the processing unit 2 generates canceling filters for generating canceling signals for suppressing, at the respective positions of the microphones 7*a*, 7*b*, 7*c*, and 7*d*, sounds output from the loud speakers 6*a*, 6*b*, 6*c*, and 6*d*.

In operation S11, the processing unit 2 determines whether an instruction to terminate the aforementioned process has been issued. For example, when outputting of audio signals from the loud speakers 6*a*, 6*b*, 6*c*, and 6*d* has been terminated or when an instruction to terminate the noise suppressing process has been issued from a user, the processing unit 2 determines that an instruction to terminate the aforementioned process has been issued. When the processing unit 2 determines, in operation S11, that no instruction to terminate the aforementioned process has been issued, the processing unit 2 causes the process to return to the operation S1 to repeat the operations from operations S1 to S10.

In operation S2, the processing unit 2 performs filtering on the spectra obtained by frequency transform, using the canceling filters generated in operation S10. When the processing unit 2 determines in operation S11 that an instruction to terminate the aforementioned process has been issued, the processing unit 2 terminates the aforementioned noise suppressing process.

In the aforementioned arrangement, the car audio device 1 according to the first embodiment does not update the respective transfer functions of sounds between the loud speakers 6*a*, 6*b*, 6*c*, and 6*d* and the microphones 7*a*, 7*b*, 7*c*, and 7*d* for all frequency components for all frames. Thus, processing load caused by updating of transfer functions is reduced. For example, when transfer functions are updated once every ten frames for all frequency components, the number of transfer functions to be updated may be reduced to a tenth of that when transfer functions are updated once for each frame for all frequency components.

Moreover, when no transfer function is updated, no canceling filter is generated. Thus, processing load in generation of canceling filters is also reduced. In this case, even when the choice on whether to update transfer functions for each frequency component is switched, i.e., even when the choice on whether to apply canceling filters for each frequency component is switched, audibility may not be degraded.

It is an object of the present invention to provide a noise suppressing device, a noise suppressing method, and a computer program that may accurately suppress noise while reducing processing load.

In the car audio device 1 according to the first embodiment, an update frequency corresponding to a transfer function changing rate in each frequency band is determined based on the content stored in the update frequency table 3*a*. Alternatively, for example, a given equation may be set in advance, and an update frequency corresponding to a transfer function changing rate in each frequency band may be determined based on the equation. In this case, the equation is such that, the higher the transfer function changing rate is, the smaller the calculated number of frames is, and the lower the transfer function changing rate is, the larger the calculated number of frames is.

In the car audio device 1 according to the first embodiment, the filtering unit 22 generates canceling signals, using canceling filters generated by the canceling filter generating unit 27, and the generated canceling signals are played back from the loud speakers 6*a*, 6*b*, 6*c*, and 6*d*, with the generated canceling signals being superimposed on audio signals. Alternatively, a loud speaker playing back canceling signals may be provided separately.

Second Embodiment

A car audio device according to a second embodiment will now be described. Since the car audio device according to the second embodiment may be implemented via components similar to components of the aforementioned car audio device 1 according to the first embodiment, the same reference numerals are assigned to similar components, and the description of similar components is omitted.

When the correlation between the first audio signals to be output from the first loud speaker 6*a* and the second loud speaker 6*b* is equal to or more than a given value, the car audio device 1 according to the second embodiment outputs the first audio signals from the first loud speaker 6*a* and the second loud speaker 6*b* after applying comb filters to the first audio signals. Similarly, when the correlation between the second audio signals to be output from the third loud speaker 6*c* and the fourth loud speaker 6*d* is equal to or more than the given value, the car audio device 1 according to the second embodiment outputs the second audio signals from the third loud speaker 6*c* and the fourth loud speaker 6*d* after applying comb filters to the second audio signals.

Figure 7:
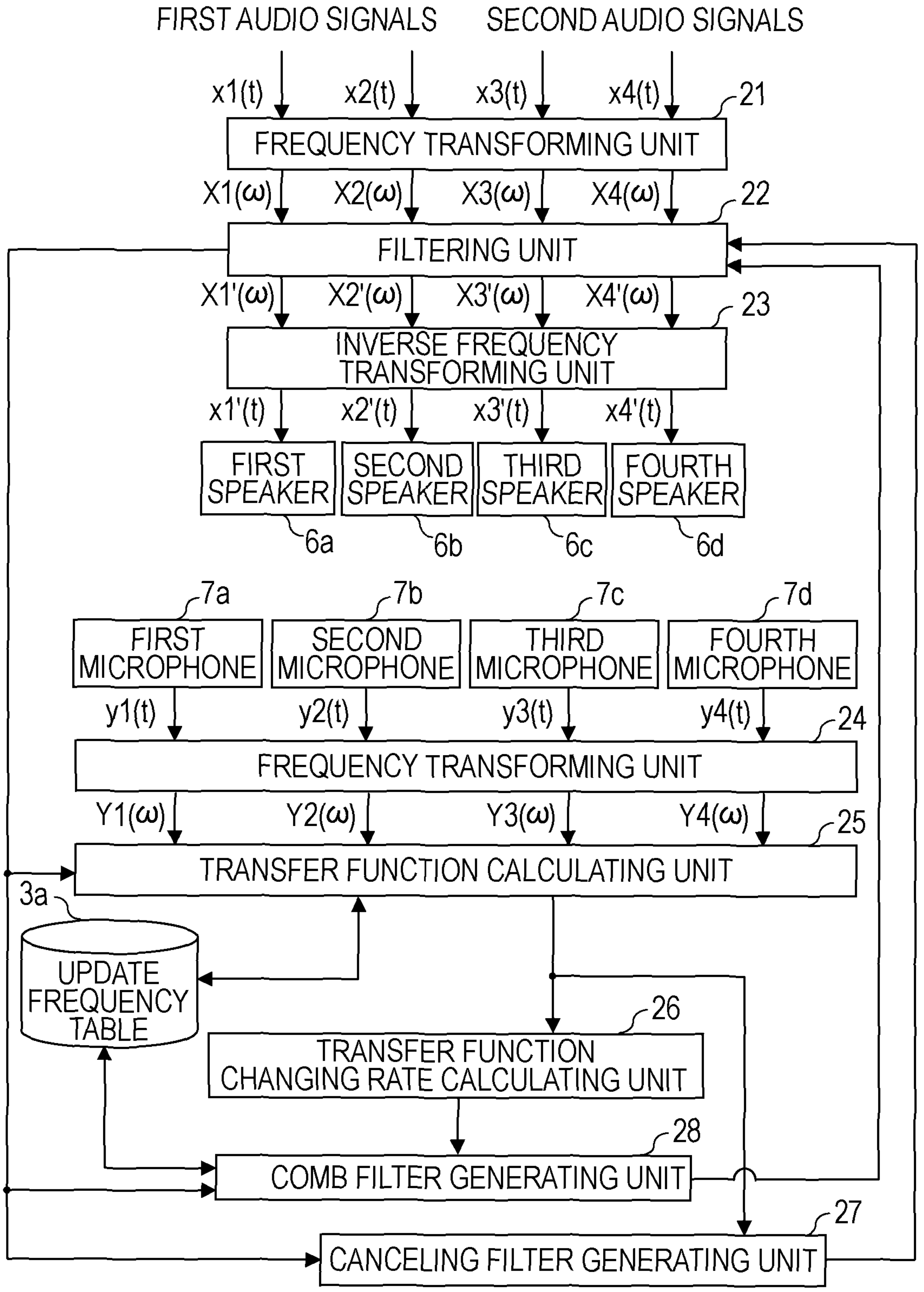
FIG. 7 is a functional block diagram depicting exemplary functional components of a car audio device according to a second embodiment.

The functions of the car audio device 1 according to the second embodiment will next be described. The functions of the car audio device 1 are implemented by the processing unit 2 executing the various control programs stored in the storage unit 3, which is a recording medium, in the car audio device 1. FIG. 7 is a functional block diagram depicting exemplary functional components of the car audio device 1 according to the second embodiment. In the car audio device 1 according to the second embodiment, the processing unit 2 implements the function of a comb filter generating unit 28 in addition to the respective functions of the components depicted in FIG. 4 by executing the control programs stored in the storage unit 3.

Regarding the spectra X1(ω), X2(ω), X3(ω), and X4(ω) obtained from the frequency transforming unit 21, for each frequency band, the filtering unit 22 according to the second embodiment calculates the degree of similarity (the cross-correlation) between the spectra X1(ω) and X2(ω) of the first audio signals to be output from the first loud speaker 6*a* and the second loud speaker 6*b* and the degree of similarity (the cross-correlation) between the spectra X3(ω) and X4(ω) of the second audio signals to be output from the third loud speaker 6*c* and the fourth loud speaker 6*d*. The filtering unit 22 sends the cross-correlation between the spectra X1(ω) and X2(ω) and the cross-correlation between the spectra X3(ω) and X4(ω) to the comb filter generating unit 28.

In this case, the filtering unit 22 performs filtering on the spectra X1(ω), X2(ω), X3(ω), and X4(ω) obtained from the frequency transforming unit 21, using filters generated by the canceling filter generating unit 27 and the comb filter generating unit 28 described below. The filtering unit 22 generates, by filtering, canceling signals for canceling, at the respective positions of the microphones 7*a*, 7*b*, 7*c*, and 7*d*, sounds output from the loud speakers 6*a*, 6*b*, 6*c*, and 6*d*.

The filtering unit 22 superimposes the generated canceling signals on the spectra obtained from the frequency transforming unit 21 and sends resulting spectra to the inverse frequency transforming unit 23. In this case, the filtering unit 22 also sends the generated spectra to the transfer function calculating unit 25 and the canceling filter generating unit 27.

The transfer function changing rate calculating unit 26 according to the second embodiment calculates, based on transfer functions calculated by the transfer function calculating unit 25 for each frequency component, the rates RC(ω) of change of the transfer functions over time for the frequency component. The transfer function changing rate calculating unit 26 averages the transfer function changing rates RC(ω) between the loud speakers 6*a*, 6*b*, 6*c*, and 6*d* and the microphones 7*a*, 7*b*, 7*c*, and 7*d* in each of the four frequency bands in the frequency direction to calculate the transfer function changing rate RC(ω) for the frequency band. The transfer function changing rate calculating unit 26 stores the transfer function changing rates RC(ω) calculated for the individual four frequency bands in the storage unit 3. The transfer function changing rate calculating unit 26 according to the second embodiment sends the transfer function changing rates RC(ω) calculated for the individual four frequency bands to the comb filter generating unit 28.

The comb filter generating unit 28 obtains the cross-correlation between the spectra X1(ω) and X2(ω) and the cross-correlation between the spectra X3(ω) and X4(ω) from the filtering unit 22. The comb filter generating unit 28 compares each of the cross-correlation between the spectra X1(ω) and X2(ω) and the cross-correlation between the spectra X3(ω) and X4(ω) with the given value. The comb filter generating unit 28 performs no operation for a frequency band in which the cross-correlation is less than the given value.

When the cross-correlation between the spectra X1(ω) and X2(ω) or the cross-correlation between the spectra X3(ω) and X4(ω) is equal to or more than the given value, the comb filter generating unit 28 generates comb filters to be applied to the audio signals X1(ω) and X2(ω) or the audio signals X3(ω) and X4(ω) to be output from the loud speakers 6*a*, 6*b*, 6*c*, and 6*d*. The comb filter generating unit 28 generates comb filters for performing filtering on the audio signals X1(ω) and X2(ω) or the audio signals X3(ω) and X4(ω) for a frequency component in which transfer functions are updated. The process of generating comb filters in the comb filter generating unit 28 will next be described.

The comb filter generating unit 28 determines, based on the transfer function changing rate RC(ω) for each of the frequency bands obtained from the transfer function changing rate calculating unit 26, whether or not transfer functions in frequency components included in each of the frequency bands are to be updated. Specifically, the comb filter generating unit 28 reads, based on the transfer function changing rate RC(ω) for each of the frequency bands obtained from the transfer function changing rate calculating unit 26, an update frequency corresponding to the transfer function changing rate RC(ω) for the frequency band from the content stored in the update frequency table 3*a*. For example, when the transfer function changing rate RC(ω) for the frequency band of $0 \le \omega < 64$ is 1.0, the comb filter generating unit 28 reads the number of frames "3" as the update frequency from the update frequency table 3*a*.

Figure 8A:
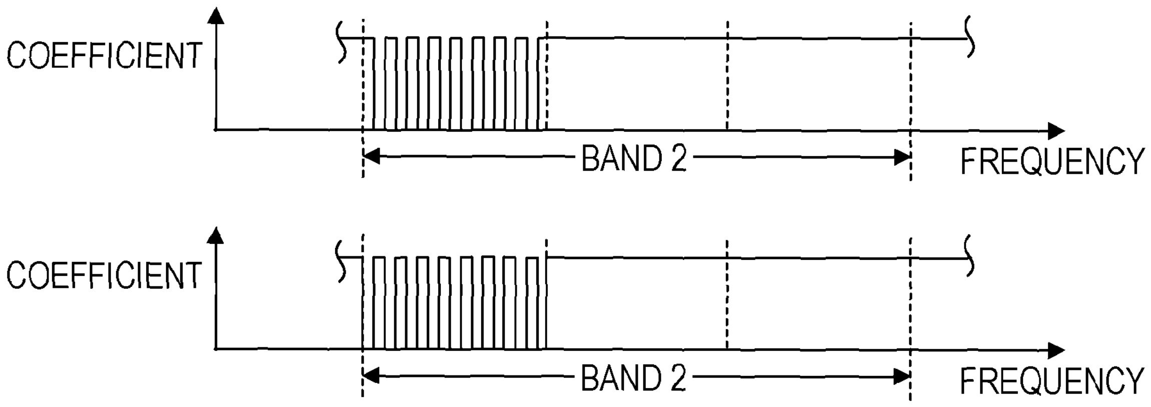
FIGS. 8A to 8C are diagrams depicting exemplary comb filters.
Figure 8B:
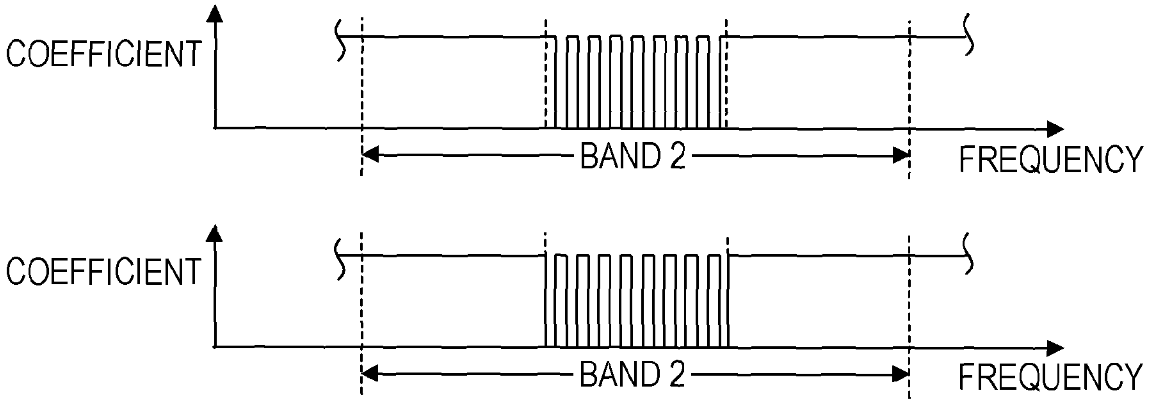
Figure 8C:
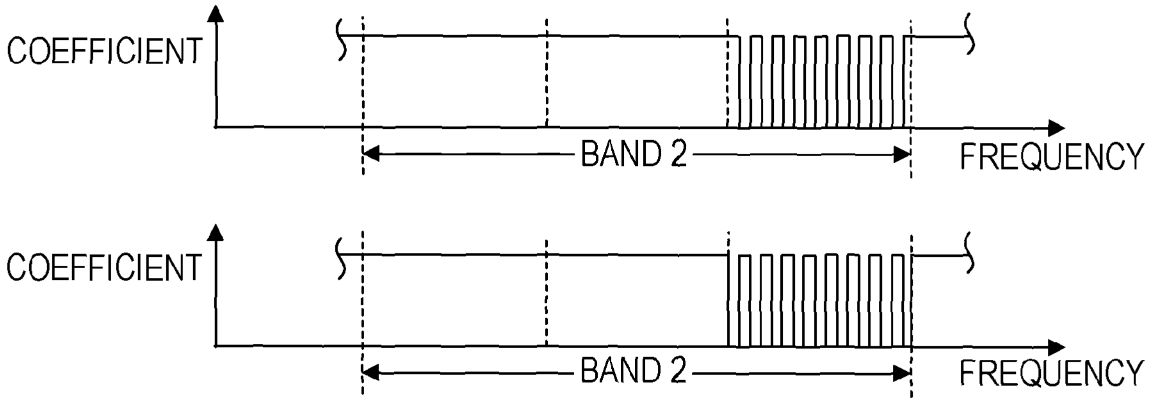

In this case, the comb filter generating unit 28 decides to update a transfer function in the frequency band of $0 \le \omega < 64$ once every three frames. FIGS. 8A to 8C are diagrams depicting exemplary comb filters. FIGS. 8A to 8C depict an exemplary arrangement of comb filters when a transfer function in a frequency band indicated by a band 2 is updated once every three frames, assuming that the horizontal axis represents a frequency, and the vertical axis represents the coefficient. FIGS. 8A, 8B, and 8C depict comb filters to be applied to the (3n+1)th frame (n=0, 1, 2, . . . ), comb filters to be applied to the (3n+2)th frame, and comb filters to be applied to the (3n)th frame, respectively.

The top of each of FIGS. 8A to 8C depicts a comb filter to be applied to one of the spectra X1(ω) and X2(ω) when the cross-correlation between the spectra X1(ω) and X2(ω) is equal to or more than the given value, and the bottom depicts another canceling filter to be applied to the other spectra. Comb filters to be applied to the spectra X1(ω) and X2(ω) (or the spectra X3(ω) and X4(ω)) when the cross-correlation between the spectra X1(ω) and X2(ω) (or the spectra X3(ω) and X4(ω)) is equal to or more than the given value are filters that are able to reduce the correlation between channels by shifting the frequencies with a coefficient of 1 in each of the channels (the loud speakers 6*a*, 6*b*, 6*c*, and 6*d*), as depicted in the top and bottom of each of FIGS. 8A to 8C.

The comb filter generating unit 28 divides each frequency band by a number based on the update frequency read from the update frequency table 3*a* and generates comb filters so that the comb filters are applied to the divided frequency bands in ascending order of the frequency component while shifting the position of a frame at which comb filters are applied by one frame. Thus, the comb filter generating unit 28 may generate comb filters in which, only for a frequency band in which transfer functions are updated, filtering may be performed on the spectra X1(ω) and X2(ω) or the spectra X3(ω) and X4(ω), the cross-correlation between which is equal to or more than the given value. The comb filter generating unit 28 generates comb filters depicted in FIGS. 8A to 8C for each frame and sends the generated comb filters to the filtering unit 22 one by one.

For the spectra X1(ω), X2(ω), X3(ω), and X4(ω) obtained from the frequency transforming unit 21, the filtering unit 22 performs filtering on a corresponding frequency component, using the canceling filters generated by the canceling filter generating unit 27 and the comb filters generated by the comb filter generating unit 28.

The filtering unit 22 generates, by this operation, canceling signals for canceling, at the respective positions of the microphones 7*a*, 7*b*, 7*c*, and 7*d*, sounds output from the loud speakers 6*a*, 6*b*, 6*c*, and 6*d*. The filtering unit 22 may reduce the correlation between audio signals to be output from the loud speakers 6*a* and 6*b* or the correlation between audio signals to be output from the loud speakers 6*c* and 6*d*.

In the car audio device 1 according to the second embodiment, components other than the filtering unit 22, the transfer function changing rate calculating unit 26, and the comb filter generating unit 28 perform operations similar to those performed by corresponding components according to the aforementioned first embodiment.

Figure 9:
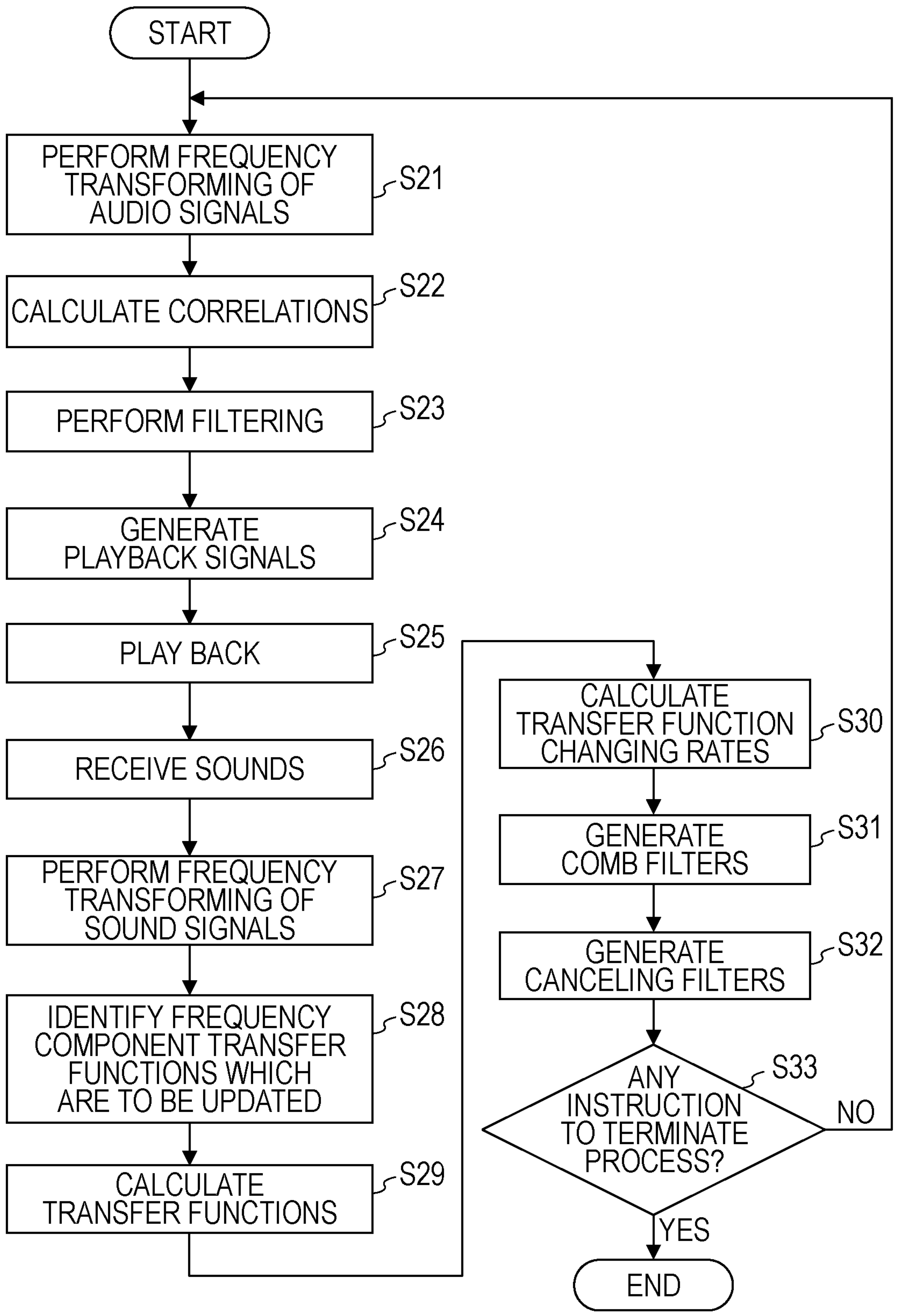
FIG. 9 is an operation chart representing an exemplary sequence of a noise suppressing process according to the second embodiment.

A noise suppressing process in the car audio device 1 according to the second embodiment will now be described based on an operation chart. FIG. 9 is an operation chart representing the sequence of the noise suppressing process according to the second embodiment. The following process is performed by the processing unit 2 according to the control programs stored in the storage unit 3 of the car audio device 1.

In operation S21, the processing unit 2 in the car audio device 1 performs frequency transform of audio signals to be output from the loud speakers 6*a*, 6*b*, 6*c*, and 6*d* to obtain audio signals (spectra) on the frequency axis. In operation S22, regarding the spectra subjected to frequency transform, the processing unit 2 calculates the correlation between the spectra of the first audio signals to be output from the first loud speaker 6*a* and the second loud speaker 6*b* and the correlation between the spectra of the second audio signals to be output from the third loud speaker 6*c* and the fourth loud speaker 6*d*.

In operation S23, the processing unit 2 performs filtering on the spectra subjected to frequency transform, using given filters. The processing unit 2 generates, by filtering, canceling signals for canceling, at the respective positions of the microphones 7*a*, 7*b*, 7*c*, and 7*d*, sounds output from the loud speakers 6*a*, 6*b*, 6*c*, and 6*d* and superimposes the generated canceling signals on the spectra subjected to frequency transform in operation S21.

In operation S24, the processing unit 2 performs inverse frequency transform of the spectra, on which the canceling signals are superimposed, to generate playback signals to be output from the loud speakers 6*a*, 6*b*, 6*c*, and 6*d*. In operation S25, the processing unit 2 plays back the generated playback signals via the loud speakers 6*a*, 6*b*, 6*c*, and 6*d*. In operation S26, in a state in which the playback signals are being played back from the loud speakers 6*a*, 6*b*, 6*c*, and 6*d*, the processing unit 2 receives sounds via the microphones 7*a*, 7*b*, 7*c*, and 7*d* and obtains sound signals. In operation S27, the processing unit 2 performs frequency transform of the obtained sound signals to obtain sound signals (spectra) on the frequency axis.

In operation S28, the processing unit 2 reads, from the storage unit 3, a transfer function changing rate in each of the given number (for example, four) of frequency bands into which the entire frequency band is divided in advance and identifies, based on the read transfer function changing rate, a frequency component with transfer functions to be updated in each of the frequency bands. Specifically, the processing unit 2 reads, based on the transfer function changing rate in each frequency band stored in the storage unit 3, an update frequency corresponding to the transfer function changing rate in the frequency band from the content stored in the update frequency table 3*a*. The processing unit 2 divides each frequency band by a number based on the update frequency read from the update frequency table 3*a* and determines whether a transfer function of a frequency component in any of the divided frequency bands is to be updated.

In operation S29, regarding frequency components the transfer functions of which are determined to be updated, the processing unit 2 calculates the respective transfer functions of sounds between the loud speakers 6*a*, 6*b*, 6*c*, and 6*d* and the microphones 7*a*, 7*b*, 7*c*, and 7*d* based on the spectra generated in operation S23 and the spectra generated in operation S27. In operation S30, the processing unit 2 calculates, based on the calculated transfer functions, the respective transfer function changing rates of the transfer functions for each frequency component. The processing unit 2 calculates, in the frequency direction, the average of the transfer function changing rates calculated for each frequency component in each of the four frequency bands and stores, in the storage unit 3, the calculated average as the transfer function changing rate in the frequency band.

In operation S31, the processing unit 2 generates comb filters for performing filtering on audio signals (the first audio signals or the second audio signals), the correlation between which is equal to or more than a given value, the correlation being calculated in operation S22, for a frequency component the transfer functions of which are determined in operation S28 to be updated. In operation S32, the processing unit 2 generates canceling filters based on the transfer functions calculated in operation S29, specifically, the transfer functions between the loud speakers 6*a*, 6*b*, 6*c*, and 6*d* and the microphones 7*a*, 7*b*, 7*c*, and 7*d*.

Specifically, for the frequency components, the transfer functions of which are determined in operation S28 to be updated, the processing unit 2 generates canceling filters for generating canceling signals for suppressing, at the respective positions of the microphones 7*a*, 7*b*, 7*c*, and 7*d*, sounds output from the loud speakers 6*a*, 6*b*, 6*c*, and 6*d*.

In operation S33, the processing unit 2 determines whether an instruction to terminate the aforementioned process has been issued or not. When the processing unit 2 determines that no instruction to terminate the aforementioned process has been issued, the processing unit 2 causes the process to return to step S21 to repeat the operations in operations S21 to S32.

In operation S23, the processing unit 2 performs filtering on the spectra obtained by frequency transform, using the comb filters generated in operation S31 and the canceling filters generated in operation S32. When the processing unit 2 determines in operation S33 that an instruction to terminate the aforementioned process has been issued, the processing unit 2 terminates the aforementioned noise suppressing process.

In the aforementioned arrangement, when the cross-correlation between the first audio signals to be output from the loud speakers 6*a* and 6*b* is equal to or more than a given value, the car audio device 1 according to the second embodiment outputs the first audio signals from the loud speakers 6*a* and 6*b* after applying comb filters to the first audio signals. Thus, the correlation between the first audio signals to be output from the loud speakers 6*a* and 6*b* may be reduced.

Moreover, when the cross-correlation between the second audio signals to be output from the loud speakers 6*c* and 6*d* is equal to or more than the given value, the car audio device 1 according to the second embodiment outputs the second audio signals from the loud speakers 6*c* and 6*d* after applying comb filters to the second audio signals. Thus, the correlation between the second audio signals to be output from the loud speakers 6*c* and 6*d* may be reduced. Especially when treating audio signals in which the correlation between channels located at the center, such as monaural sound sources and vocals, is high, an effect caused by reducing the correlation between the channels may be achieved.

Moreover, since the car audio device 1 according to the second embodiment applies comb filters only to a frequency band in which transfer functions are updated, deterioration in the sound quality of audio signals may be suppressed. In this case, since the human frequency resolution is low, even when comb filters are locally applied to audio signals, audibility may not be degraded.

Third Embodiment

A car audio device according to a third embodiment will now be described. In the first and second embodiments described above, the variance $V(\omega)$ of values of a transfer function over time is used as a transfer function changing rate functioning as an index for determining the update frequency of a transfer function in each frequency component. In the third embodiment, other exemplary transfer function changing rates will be described.

For example, the car audio device 1 may use the ratio of the value of a transfer function in the current frame to the time average of values of the transfer function as the transfer function changing rate. Specifically, regarding each transfer function calculated by the transfer function calculating unit 25 for each frequency component, the transfer function changing rate calculating unit 26 calculates the time average of values of the transfer function in frames up to the current frame for the frequency component. The transfer function changing rate calculating unit 26 calculates the ratio of the value of the transfer function in the current frame to the calculated time average and compares the calculated ratio with a given range defined with two thresholds.

When the calculated ratio falls within the given range, the transfer function changing rate calculating unit 26 determines that the transfer function changing rate is a first changing rate. Otherwise, the transfer function changing rate calculating unit 26 determines that the transfer function changing rate is a second changing rate that is higher than the first changing rate. That is, when the ratio of the value of a transfer function in the current frame to the time average of values of the transfer function falls within the given range, the transfer function changing rate calculating unit 26 determines that the changing rate of the transfer function is low, and otherwise, the transfer function changing rate calculating unit 26 determines that the changing rate of the transfer function is high. Thus, when the ratio of the value of a transfer function in the current frame to the time average of values of the transfer function falls within the given range, since the changing rate of the transfer function is determined as being low, the update frequency of the transfer function is also determined as being low.

Moreover, the car audio device 1 may use the average of respective absolute values of differences between the time average of values of a transfer function and values of the transfer function as the transfer function changing rate. Specifically, regarding each transfer function calculated by the transfer function calculating unit 25 for each frequency component, the transfer function changing rate calculating unit 26 calculates the time average of values of the transfer function in frames up to the current frame for the frequency component. For the frequency component, the transfer function changing rate calculating unit 26 calculates the differences between the calculated time average and the values of the transfer function in the frames up to the current frame and calculates the average of respective absolute values of the calculated differences as the transfer function changing rate. Specifically, the transfer function changing rate calculating unit 26 calculates the transfer function changing rate based on equation 6 in FIG. 11E.

In equation 6 in FIG. 11E, n expresses the number of frames up to the current frame, and x expresses values of a transfer function in the frames.

Moreover, the car audio device 1 may use the difference between the time average of values of a transfer function and the value of the transfer function in the current frame as the transfer function changing rate. Specifically, regarding each transfer function calculated by the transfer function calculating unit 25 for each frequency component, the transfer function changing rate calculating unit 26 calculates the time average of values of the transfer function in frames up to the current frame for the frequency component. For the frequency component, the transfer function changing rate calculating unit 26 calculates the difference between the calculated time average and the value of the transfer function in the current frame as the transfer function changing rate. Alternatively, for the frequency component, the transfer function changing rate calculating unit 26 may calculate the ratio between the calculated time average and the value of the transfer function in the current frame as the transfer function changing rate.

In the car audio device 1 according to the third embodiment, even when the aforementioned transfer function changing rates are used, operations similar to those in the car audio device 1 according to each of the first and second embodiments described above may be performed. Thus, effects similar to those of the first and second embodiments may be achieved.

Fourth Embodiment

Figure 10:
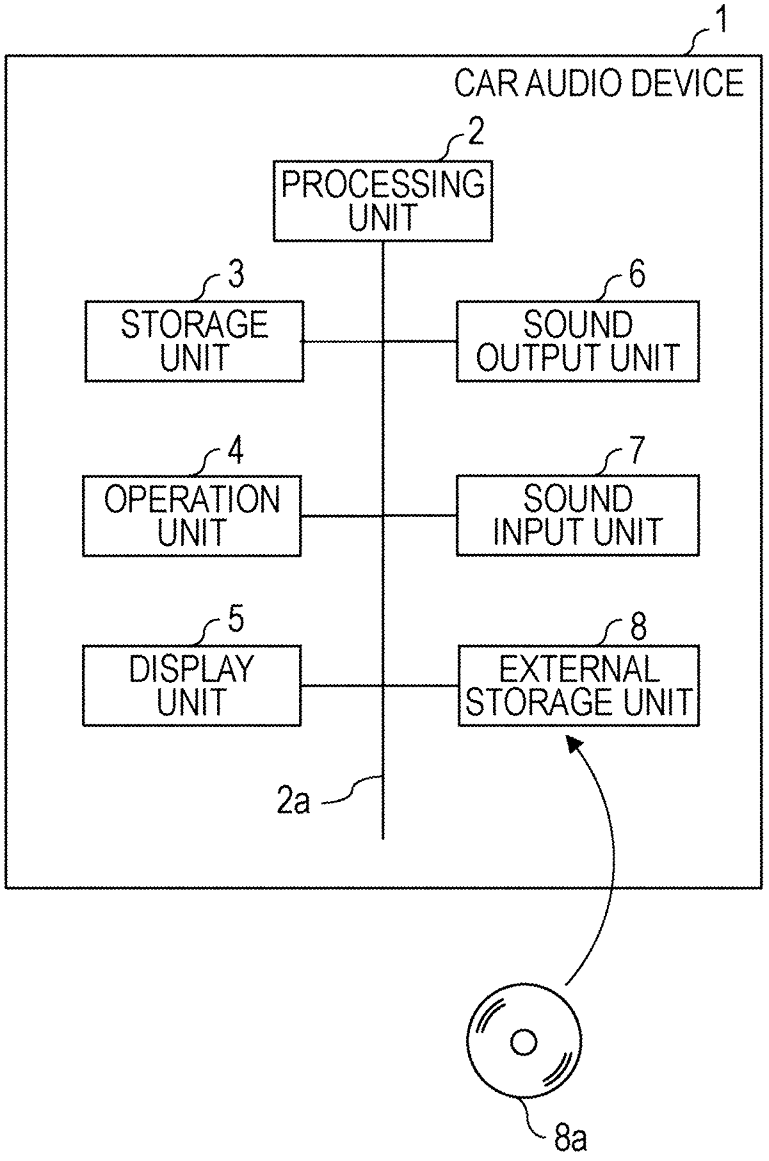
FIG. 10 is a block diagram depicting an exemplary configuration of a car audio device according to a fourth embodiment.

A car audio device according to a fourth embodiment will now be described. FIG. 10 is a block diagram depicting an exemplary configuration of the car audio device according to the fourth embodiment. The car audio device 1 according to the fourth embodiment includes an external storage unit 8 in addition to the hardware components depicted in FIG. 2. The external storage unit 8 may be, for example, a Compact Disc Read Only Memory (CD-ROM) drive or a Digital Versatile Disc (DVD) drive and reads, from a recording medium 8*a* that may be, for example, a CD-ROM or a DVD-ROM, data stored in the recording medium 8*a*.

The control programs to operate as the car audio device 1 described in each of the aforementioned embodiments are recorded on the recording medium 8*a*. The external storage unit 8 reads the control programs from the recording medium 8*a* and causes the storage unit 3 to store the control programs. The processing unit 2 performs the control programs stored in the storage unit 3, so that the car audio device 1 according to the fourth embodiment operates in a manner similar to that of the car audio device 1 described in each of the aforementioned embodiments.

Other than a CD-ROM or a DVD-ROM, various types of recording media, such as a flexible disk, a memory card, and a Universal Serial Bus (USB) memory, may be used as the recording medium 8*a*. Moreover, the car audio device 1 may include a communication unit for connecting to a network such as the Internet or a local area network (LAN). In this case, in the car audio device 1, the control programs to operate as the car audio device 1 described in each of the aforementioned embodiments may be downloaded via the network to be stored in the storage unit 3.

Further, according to an aspect of the embodiments, any combinations of the described features, functions and operations may be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. A noise suppressing device that suppresses a noise component included in received sounds, the noise suppressing device comprising:

a memory that stores a program including a procedure; and a processor that executes the program, the procedure including:

inputting a plurality of sounds from a given sound source and converting the sounds to sound signals on a time axis;

performing a frequency transform of the sound signals after dividing the sound signals into units of a frame and calculating respective transfer characteristics of the sounds transmitted from the sound source for each of at least one frequency band;

storing the transfer characteristics of the sounds calculated for each frequency band;

calculating, for each frequency band, a changing rate of the transfer characteristics over time, obtaining, in response to the changing rate calculated, a frequency for updating the transfer characteristics stored for each frequency band;

updating the transfer characteristics stored every given number of frames corresponding to the frequency obtained for each frequency band;

generating suppression information for suppressing the noise component based on the transfer characteristics as updated; and suppressing the noise component based on the suppression information generated.

2. The noise suppressing device according to claim 1, further comprising:

performing, for each frequency band in which the updating updates the transfer characteristics, filtering on the sound signals, using given comb filters; and outputting, from the given sound source, the sound signals subjected to filtering, wherein the plurality of sounds are input from a plurality of sound sources and the sounds are converted to the sound signals, and the transfer characteristic of the sounds transmitted from the given sound source is calculated, based on the sound signals subjected to filtering and the sound signals converted.

3. The noise suppressing device according to claim 2, further comprising calculating, for each frequency band, a correlation value among the sound signals to be output from each of the plurality of sound sources, wherein filtering on respective sound signals output from the plurality of sound sources is performed using the given comb filters, the sound signals being in frequency bands that have a correlation value calculated equal to or higher than a given value and that have transfer characteristics updated.

4. The noise suppressing device according to claim 1, wherein the frequency corresponding to the changing rates is calculated based on a correspondence in which, as the changing rate increases, a higher frequency is associated with the changing rate.

5. The noise suppressing device according to claim 2, wherein the frequency corresponding to the changing rates is calculated based on a correspondence in which, as the changing rate increases, a higher frequency is associated with the changing rate.

6. The noise suppressing device according to claim 3, the frequency corresponding to the changing rates is calculated based on a correspondence in which, as the changing rate increases, a higher frequency is associated with the changing rate.

7. The noise suppressing device according to claim 1, further comprising calculating a time average of the transfer characteristics calculated, for each frequency band, wherein a ratio of the transfer characteristics is calculated, corresponding to the time average calculated, as the changing rate, and wherein when the ratio calculated within a given range, the frequency obtained is lower than when the ratio is not within the given range.

8. The noise suppressing device according to claim 2, further comprising calculating a time average of the transfer characteristics calculated, for each frequency band, wherein a ratio of the transfer characteristics is calculated, corresponding to the time average calculated, as the changing rate, and wherein when the ratio calculated by the changing rate obtaining unit is within a given range, the frequency obtained is lower than when the ratio is not within the given range.

9. The noise suppressing device according to claim 3, further comprising calculating a time average of the transfer characteristics calculated, for each frequency band, wherein a ratio of the transfer characteristics is calculated, corresponding to the time average calculated, as the changing rate, and wherein when the ratio calculated is within a given range, the frequency obtained is lower than when the ratio is not within the given range.

10. The noise suppressing device according to claim 1, wherein one of a variance of the transfer characteristics is calculated and a standard deviation of the transfer characteristics is calculated, as the changing rate.

11. The noise suppressing device according to claim 2, wherein one of a variance of the transfer characteristics is calculated and a standard deviation of the transfer characteristics is calculated, as the changing rate.

12. The noise suppressing device according to claim 1, further comprising calculating a time average of each of the transfer characteristics calculated, for each frequency band, wherein an average of an absolute value of a difference between each of the transfer characteristics calculated is calculated and a corresponding time average is calculated, as the changing rate.

13. The noise suppressing device according to claim 2, further comprising calculating a time average of each of the transfer characteristics calculated, for each frequency band, wherein an average of an absolute value of a difference between each of the transfer characteristics is calculated and a corresponding time average is calculated, as the changing rate.

14. The noise suppressing device according to claim 1, further comprising calculating a time average of each of the transfer characteristics calculated, for each frequency band, wherein a difference or a ratio between the average is calculated and the transfer characteristics is calculated, as the changing rate.

15. The noise suppressing device according to claim 2, further comprising calculating a time average of each of the transfer characteristics calculated, for each frequency band, wherein a difference or a ratio between the average is calculated and the transfer characteristics is calculated, as the changing rate.

16. A noise suppressing method that causes a computer program to cause a computer to function as a noise suppressing device that suppresses a noise component included in sounds received by the computer, the computer program comprising:

inputting sounds from a given sound source and converting the sounds to sound signals on a time axis;

performing frequency transform on the sound signals after dividing the sound signals into units of a frame and calculating respective transfer characteristics of the sounds transmitted from the sound source for each given frequency band;

calculating, for each frequency band, a changing rate of the transfer characteristics over time;

obtaining, for each frequency band in response to the changing rate calculated by the changing rate obtaining unit, a frequency of updating a storage unit that stores the transfer characteristics of the sounds calculated for each frequency band;

updating the transfer characteristics stored in the storage unit every given number of frames corresponding to the frequency obtained for each frequency band;

generating suppression information for suppressing the noise component based on the transfer characteristics as updated; and suppressing the noise component based on the generated suppression information.

17. A computer-readable recording medium storing a computer program causing a computer to function as a noise suppressing device that suppresses a noise component included in sounds received by the computer, the computer program comprising:

inputting sounds from a given sound source and converting the sounds to sound signals on a time axis, by the computer;

performing frequency transform of the sound signals after dividing the sound signals into frames and calculating respective transfer characteristics of the sounds transmitted from the sound source for each given frequency band, by the computer;

calculating, for each frequency band, a changing rate of the transfer characteristics over time;

obtaining, for each frequency band, a frequency of updating a storage unit that stores the transfer characteristics of the sounds calculated for each frequency band, by the computer;

updating the transfer characteristics stored in the storage unit every given number of frames corresponding to the frequency obtained for each frequency band, by the computer;

generating suppression information for suppressing the noise component based on the transfer characteristics as updated, by the computer; and suppressing the noise component based on the generated suppression information, by the computer.

* * * * *

UNITED STATES PATENT AND TRADEMARK OFFICE

CERTIFICATE OF CORRECTION

PATENT NO. : 8,792,652 B2
APPLICATION NO. : 12/710425
DATED : July 29, 2014
INVENTOR(S) : Taisuke Itou It is certified that error appears in the above-identified patent and that said Letters Patent is hereby corrected as shown below:

In the Claims

Column 22, Line 16 (Approx.), In Claim 7, Delete "calculated" and insert -- calculated is --, therefor.

Column 22, Line 25-26 (Approx.), In Claim 8, Delete "calculated by the changing rate obtaining unit" and insert -- calculated --, therefor.

Signed and Sealed this
Twenty-eighth Day of October, 2014

Michelle K. Lee

Michelle K. Lee
*Deputy Director of the United States Patent and Trademark Office*